United States Patent
Sarma et al.

(10) Patent No.: US 10,194,288 B2
(45) Date of Patent: Jan. 29, 2019

(54) STICKER DISTRIBUTION SYSTEM FOR MESSAGING APPS

(71) Applicant: Apple Inc., Cupertino, CA (US)

(72) Inventors: Bhaskar P. Sarma, Santa Clara, CA (US); Kevin J. Lindeman, Morgan Hill, CA (US); Roberto Garcia, Santa Clara, CA (US); Adele C. Peterson, Los Gatos, CA (US); David Alex Carter, San Francisco, CA (US); Justin N. Wood, Sunnyvale, CA (US); Eugene M. Bistolas, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/398,553

(22) Filed: Jan. 4, 2017

(65) Prior Publication Data

US 2017/0359701 A1    Dec. 14, 2017

Related U.S. Application Data

(60) Provisional application No. 62/349,084, filed on Jun. 12, 2016, provisional application No. 62/349,101, filed on Jun. 12, 2016, provisional application No. 62/349,113, filed on Jun. 12, 2016, provisional application No. 62/349,091, filed on Jun. 12, 2016.

(51) Int. Cl.
    *H04W 4/14*      (2009.01)
    *H04L 12/58*     (2006.01)

(52) U.S. Cl.
    CPC .............. *H04W 4/14* (2013.01); *H04L 51/046* (2013.01); *H04L 51/063* (2013.01); *H04L 51/10* (2013.01)

(58) Field of Classification Search
    CPC ........... H04N 21/4788; H04N 21/4312; H04N 21/4438; H04N 7/157; H04N 21/4316; H04N 21/440263; H04N 5/272; H04N 21/25; H04N 21/25825; H04N 21/4126; H04N 21/41407; H04N 21/4532; H04N 21/4622
    See application file for complete search history.

(56) References Cited

U.S. PATENT DOCUMENTS 7,669,134 B1     2/2010    Christie et al.
2012/0185542 A1  7/2012    Vyrros et al.
(Continued)

FOREIGN PATENT DOCUMENTS

WO    WO 2015/162072 A2    10/2015
WO    WO 2015/183456 A1    12/2015

OTHER PUBLICATIONS

European Patent Application No. 17174969.0, Partial European Search Report dated Jul. 26, 2017, 13 pages.
(Continued)

*Primary Examiner* — George Eng
*Assistant Examiner* — Umair Ahsan
(74) *Attorney, Agent, or Firm* — Morgan, Lewis & Bockius LLP

(57) ABSTRACT

A distribution system for distributing stickers that are available in a set of different resolutions for different target devices is described. The distribution system (e.g. a messaging sticker store) can create a bundle of stickers for each screen resolution in the set of target devices.

21 Claims, 30 Drawing Sheets

(56) References Cited

U.S. PATENT DOCUMENTS

| | | | | |
|---|---|---|---|---|
| 2015/0334067 A1* | 11/2015 | Zonka | .................... | H04L 67/36 715/752 |
| 2015/0347748 A1 | 12/2015 | Krstic et al. | | |
| 2016/0112703 A1* | 4/2016 | Hafey | .................... | H04N 19/33 382/232 |
| 2016/0125478 A1* | 5/2016 | Saura | ................. | G06Q 30/0277 705/14.16 |
| 2016/0259526 A1* | 9/2016 | Lee | .................... | G06F 3/04817 |
| 2016/0358367 A1* | 12/2016 | Metz | .................... | G06F 17/212 |
| 2017/0085932 A1* | 3/2017 | Berenger | ............ | H04L 67/2842 |
| 2017/0206697 A1* | 7/2017 | McKenzie | .............. | G06T 13/80 |

OTHER PUBLICATIONS

PCT International Search Report and Written Opinion for International Application No. PCT/US2017/034340, dated Jul. 19, 2017, 10 pages.
Complete Guide—Messenger Platform—Technical Implementation, downloaded May 27, 2016, https://developers.facebook.com/docs/messenger-platform/implementation, 18 pages.
Getting Started—Messenger Platform—downloaded May 27, 2016, http://developers.facebook.com/docs/messenger-platform/quickstart, 6 pages.
Google launches time-saving keyboard for iPhones, May 12, 2016, 2 pages.
Business Insider—Snapchat now lets you add fun stickers to photos and videos, May 23, 2016, 4 pages.
U.S. Appl. No. 15/275,136, filed Sep. 23, 2016.
U.S. Appl. No. 15/275,103, filed Sep. 23, 2016.
U.S. Appl. No. 15/389,219, filed Dec. 22, 2016.
U.S. Appl. No. 15/400,544, filed Jan. 6, 2017.
U.S. Appl. No. 15/399,203, filed Jan. 5, 2017.
U.S. Appl. No. 15/411,176, filed Jan. 20, 2017.
U.S. Appl. No. 15/399,115, filed Jan. 5, 2017.
U.S. Appl. No. 15/389,230, filed Dec. 22, 2016.
U.S. Appl. No. 15/272,230, filed Sep. 21, 2016.
U.S. Appl. No. 15/400,780, filed Jan. 6, 2017.
U.S. Appl. No. 15/274,518, filed Sep. 23, 2016.

* cited by examiner

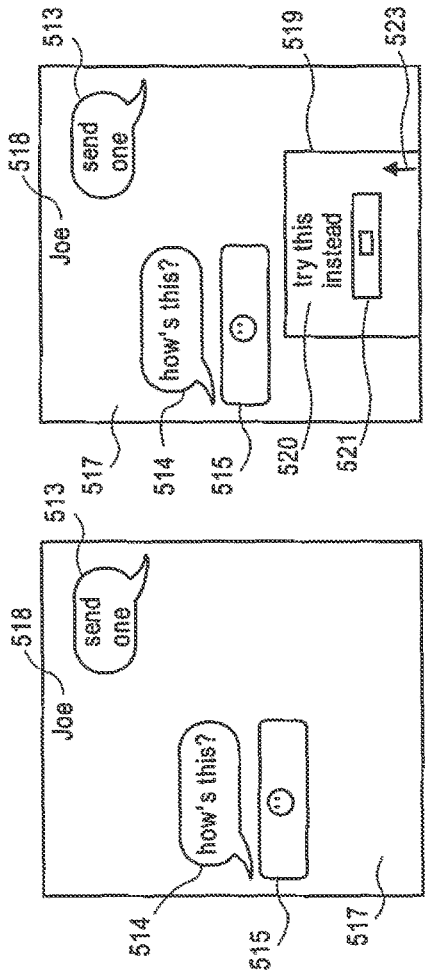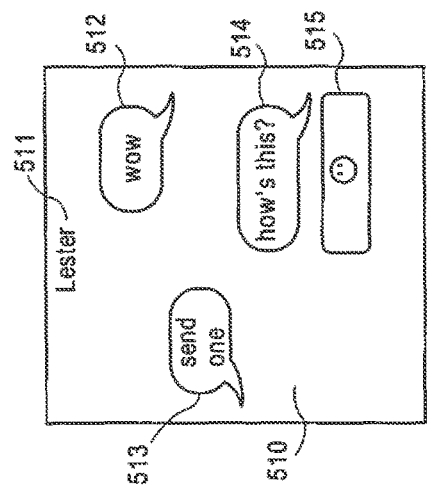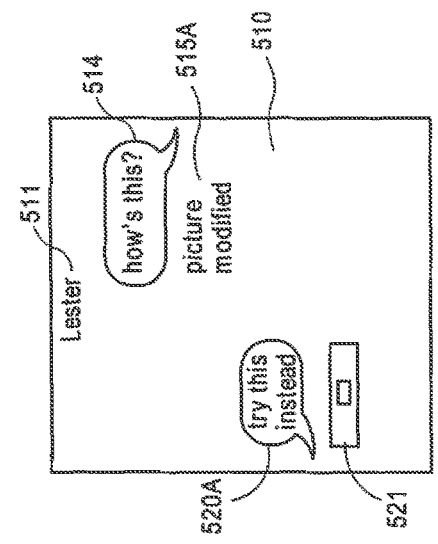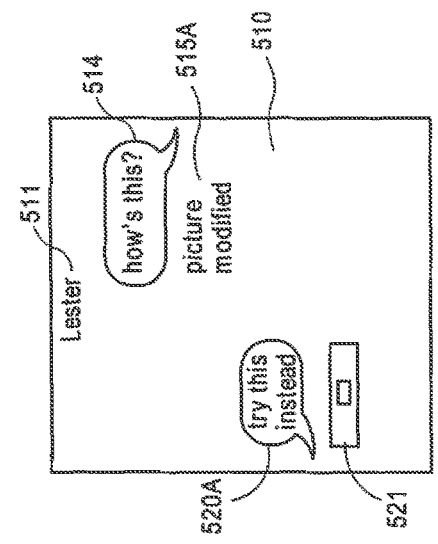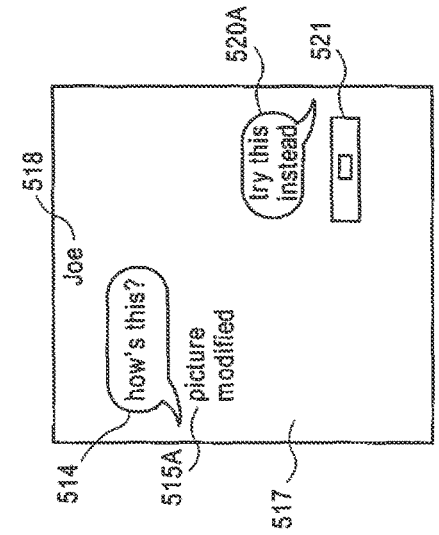

STICKER DISTRIBUTION SYSTEM FOR MESSAGING APPS

This application claims the benefit of U.S. Provisional Patent Application No. 62/349,084, filed on Jun. 12, 2016, which application is incorporated herein by reference. This application is also related to and claims the benefit of the following U.S. Provisional Patent Application Nos. (all of which are incorporated herein by reference): 62/349,101, filed Jun. 12, 2016; 62/349,113, filed Jun. 12, 2016; and 62/349,091, filed Jun. 12, 2016.

BACKGROUND

The embodiments described in this disclosure relate to messaging systems such as text messaging systems on cellular telephones or other communication devices or data processing systems.

The use of text messaging systems began many years ago. For example, wireless cellular telephone carriers, such as Verizon or AT&T, allowed text messages through the Short Message Service (SMS) for cell phones in the 1990s before smartphones were available. Typically, the amount of data transmitted has been limited by rules established by the carriers. Recently, as the use of smartphones (e.g. iPhones) and tablet computers (e.g. iPad) has increased, the text messaging systems have developed the ability to send images, such as photos or emojis. In addition, messaging systems such as iMessage from Apple Inc. of Cupertino, California have allowed users to also send and receive text and images through "public" networks which include "public" WiFi access points and the Internet (in addition to using the wireless carrier's private cellular telephone networks), and messaging systems such as iMessage can seamlessly transition between the use of public and private networks depending on the availability of, for example, WiFi access points or the compatibility of the other user's device (which may not be compatible with iMessage).

Recently, it has also been possible to obtain (e.g., purchase and download) emojis or stickers for use in text messaging. These emojis or stickers can be obtained from an online store, such as the iTunes store and used in text messages.

SUMMARY OF THE DESCRIPTION

One aspect of the embodiments described herein relate to a messaging system in which stickers can be applied to messages that are sent from one messaging app to another messaging app. These stickers can be sticker images that are created in a set of different resolutions such as N (e.g., N=3) different resolutions for a particular image. For example, a particular sticker can have in one embodiment three different versions of the same image, but each being for use on devices with different screen resolutions. For example, a particular sticker can have a non-retina version, a retina version, and an iPhone 6S version. In one embodiment, these stickers or sticker images can be uploaded and then grouped in different bundles which can contain different sticker images but all having the same resolution for use on a device with a particular screen resolution. For example, a bundle of stickers, each configured for use of the particular screen resolution, can be created and placed on one more servers to allow downloading of the bundle for a device that has the corresponding screen resolution. Once downloaded by the user of that device, the user can select a sticker from the bundle and apply it to a message and send the message with the sticker to another user who has a different resolution device. The message sent in one embodiment does not include an image file for the sticker but rather includes an identifier, such as a universally unique identifier of the particular sticker. In one embodiment, the message sent also includes a message bubble identifier to specify the bubble in the message transcript to apply the sticker to. In one embodiment, the messaging app on the receiving device can use the identifier to determine whether the receiving device has the sticker in a local cache for its screen resolution. If it does not, then the receiving device can obtain the sticker in one embodiment by purchasing the bundle or by obtaining the sticker through the use of an authorization token which can be provided by the sending device, wherein the authorization token can be used by the receiving device to retrieve the sticker for its resolution. After receiving the sticker, the receiving device can display the message with the sticker within a message transcript of the message app on the receiving device. If the receiving device cannot support sticker images on a message transcript in the message app, then a backward compatible solution can be provided such as displaying the word "sticker" in or near the message bubble identified by the messaging bubble identifier.

A method according to one embodiment described herein can include the following operations: receiving a plurality of stickers, wherein for each image in the plurality of stickers there are a plurality of versions of the image for use with different screen resolutions; creating a plurality of bundles, each of the bundles containing stickers of one of the different screen resolutions; receiving a first request from a first device for a set of stickers, the first request specifying a screen resolution of the first device; sending, in response to the first request, one of the bundles that is for use with the screen resolution of the first device. In one embodiment, one of the versions of the plurality of versions is a high resolution version for use on a high resolution screen and another version of the plurality of versions is a low resolution version for use on a low resolution screen. In one embodiment, each of the bundles contains stickers of only one of the different screen resolutions. In one embodiment, the method can be performed by one or more servers in a service that provides one or more of: catalogs of apps for browsing for apps, downloading of apps, downloading of messaging extension apps, and stickers which can be downloaded from the service. In one embodiment, the plurality of stickers can be received from a developer of stickers or a graphic artist. In one embodiment, the first request is from a first messaging app that is configured to communicate text messages with other messaging apps through one or more messaging servers. In one embodiment, the first request specifies the screen resolution of the first device either implicitly or explicitly. In one embodiment, the first request can implicitly specify the screen resolution by specifying a set of model and manufacturer identifiers or a set of one or more traits known by the one or more servers that implicitly specify the screen resolution of the first device. In one embodiment, each bundle can include a metadata file that contains sticker identifiers, one for each sticker in the bundle.

The method can also include receiving a second request from a second device for the set of stickers, the second request specifying a screen resolution of the second device which can be different than the screen resolution of the first device; and sending, in response to the second request, either one of the bundles that is for use with the screen resolution of the second device or the sticker which was identified in the second request and which is also for use with the screen resolution of the second device.

In one embodiment the method can also include in each bundle an attribution or identifier of the developer of the stickers or the graphic artist. This attribution or identifier can be displayed at least temporarily on or near the sticker or a message bubble to which the sticker is attached. The attribution or identifier can allow a user to acquire additional stickers from that developer or graphic artist. In one embodiment, the attribution or identifier can be temporarily displayed and displayed only in the first instance when the sticker is first presented or displayed and thereafter the attribution or identifier is no longer displayed.

In one embodiment, the method can also include the use of an authorization token which was sent, with an identifier of one of the stickers in the bundle, from the first device to a second device which uses the authorization token and the identifier to retrieve the sticker that is identified by the identifier and that is for use with the screen resolution of the second device. The authorization token can allow the second device to retrieve and display the sticker without purchasing the entire bundle which contained that sticker.

The methods and systems described herein can be implemented by data processing systems, such as one or more smartphones, tablet computers, desktop computers, laptop computers, smart watches, wearables, audio accessories, on board computers, and other data processing systems and other consumer electronic devices. The methods and systems described herein can also be implemented by one or more data processing systems which execute executable computer program instructions, stored in one or more non-transitory machine readable media that cause the one or more data processing systems to perform the one or more methods described herein when the program instructions are executed. Thus, the embodiments described herein can include methods, data processing systems, and non-transitory machine readable media.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIGS. 9D, 9E, 9F, 9G, and 9H show an example of the message transcripts on two different devices that are involved in a conversation between two messaging apps, one on each device, wherein the conversation involves a session between two extension apps. The user interface shown in FIGS. 9D, 9E, 9F, 9G and 9H show how content in message bubbles created by the extension apps can be converted into breadcrumbs according to one or more embodiments described herein.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1A:
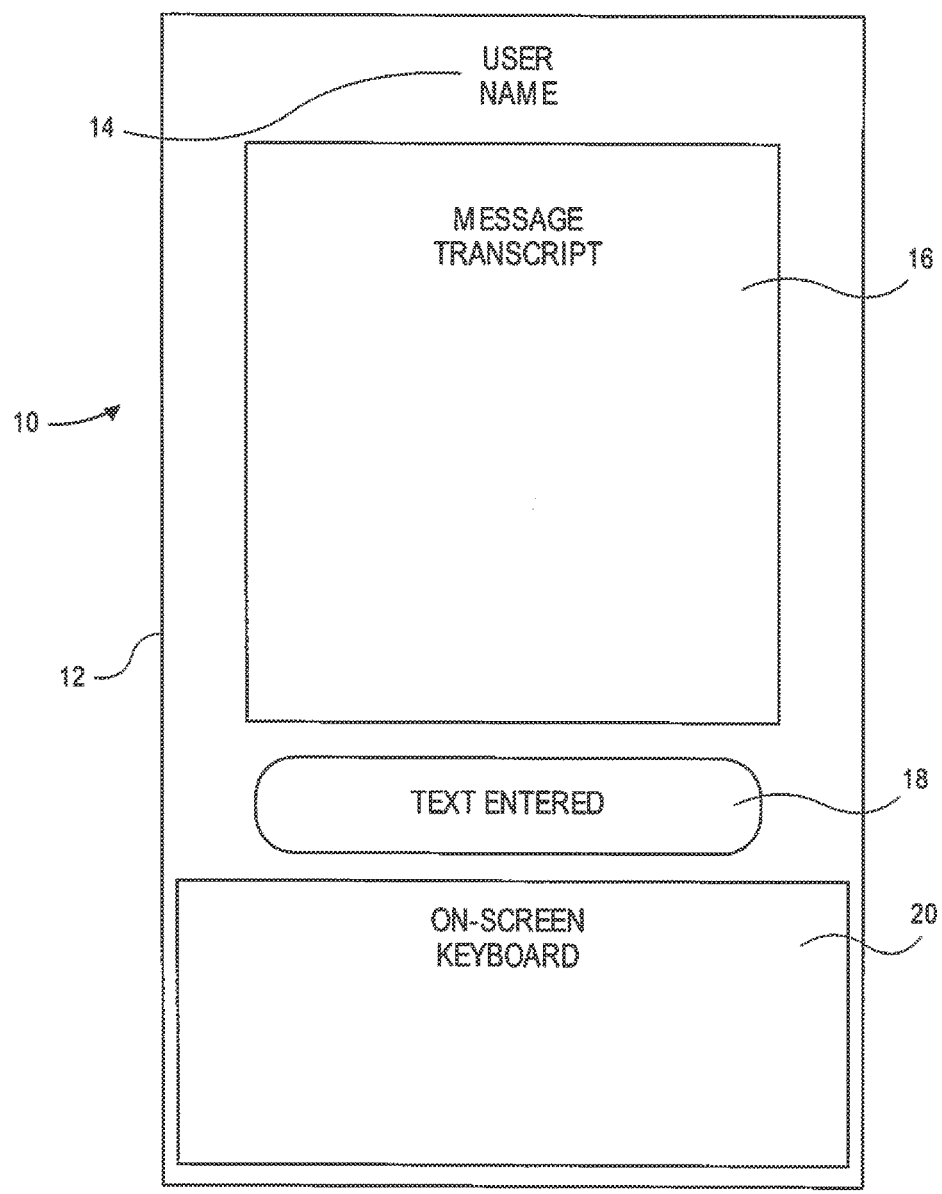
FIG. 1A shows an example of a user interface for a messaging app on a communication device.

The various embodiments described herein relate to messaging systems such as text messaging systems or "chat" messaging systems or other systems which allow devices to communicate messages between the devices. For example, iMessage from Apple Inc. of Cupertino, Calif. is an example of a messaging service for iOS devices and Mac (OS X) computers. Typically, a messaging system includes the plurality of client devices, each including at least one messaging app, and a set of one or more messaging servers that can receive messages from client devices and transmit messages to client devices. FIG. 1A shows an example of a user interface of a messaging app on a client device. The client device can be a communication device 10 which can be a smartphone, or tablet computer, or a desktop computer or a laptop computer, wearable, on-board computer, or other data processing systems or other consumer electronics devices. In one embodiment, the device can include a conventional touch screen that can both display images and also accept touch inputs from a user. The touch screen 12 on the communication device can display the user interface of the messaging app which can include a message transcript 16 and an on-screen keyboard 20 below the message transcript 16. In addition, the user interface of the messaging app can include a user name 14 indicating the recipient, in one embodiment, of messages sent from the communication device 10. In addition, the user interface can include a text entry region 18 which indicates the content of the text entered by the user before it is sent; in a sense, the text entry region 18 is a text staging area indicating text that is ready to be sent to the recipient.

Figure 1B:
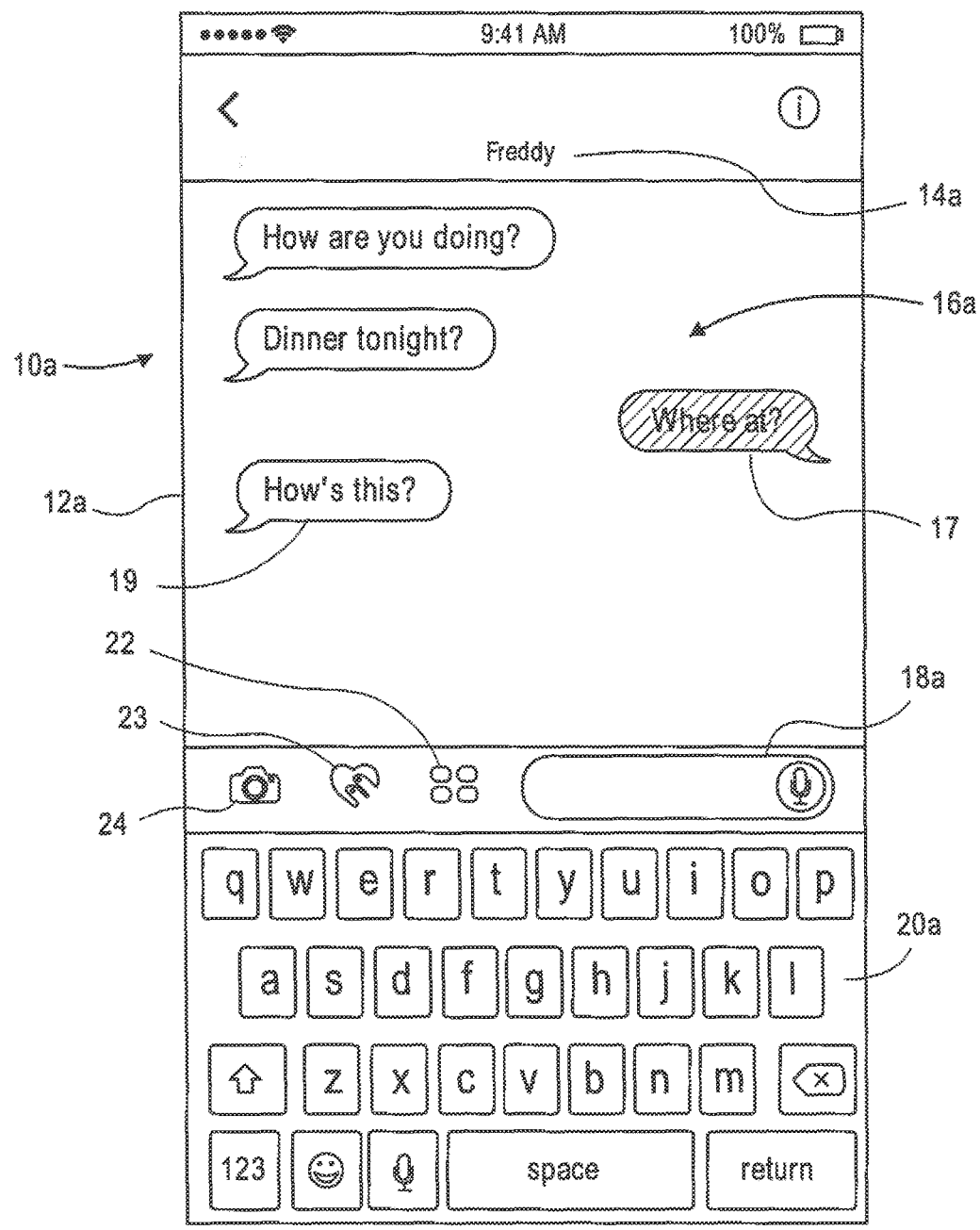
FIG. 1B shows another example of a user interface for a messaging app on a communication device.

FIG. 1B shows a more detailed example of a user interface of a messaging app on a communication device 10A. The user interface is displayed in this embodiment on touch screen 12A and includes on-screen keyboard 20A, text entry region 18A, a message transcript 16A and a user name 14A showing the name of the other user(s) to whom messages are sent and from whom messages are received. The text entry region 18A is a staging area for content such as one or more of text, stickers, extension app content, images etc. which are ready to be sent in response to the user's selection of the send command (and in one embodiment, the content can be edited in the staging area). In the example shown in FIG. 1B, messages from Freddy (user name 14A) are shown on the left side of the message transcript 16A and messages sent by the user of communication device 10A are shown on the right side of message transcript 16A. Hence, message bubble 17 shows the message "Where at?" sent by the user of communication device 10A to Freddy as a response to the message from Freddy "Dinner tonight?". The message in message bubble 17 causes Freddy to respond with "How's this?" shown in message bubble 19. The use of the word "bubble", such as message bubble or session bubble, etc. is not meant to imply any specific shape or form; rather it is intended to mean any shape or form of demarcation between messages between two or more participants, and thus the demarcation can use boxes or lines or message containers or different colors, etc. Thus the phrase "message bubble" is meant to cover all such demarcations (or other ways to distinguish) between messages between two or more participants, and particularly in the context of such demarcations or other ways to distinguish in a message transcript. In one embodiment, the message transcript can be scrolled up and down and messages in the message transcript are presented in sequence according to their time, thus the user can see the actual chat or conversation over time by scrolling the view up or down. The user interface shown in FIG. 1B also includes three icons 22, 23, and 24 above the on-screen keyboard 20A and to the left of the text entry region 18A. The extension apps view icon 22, when selected, causes the display of a view of the installed extensions app that can operate with the messaging app, and the view provided can be a browsable view, such as the browsable view 157 shown in FIG. 4B to allow the user to scroll through multiple pages showing all of the installed extension apps that are configured to operate with the messaging app according to the one or more embodiments described herein. The imaging app icon 23 can in one embodiment be an icon that when selected causes the launching of a plugin of the messaging app that provides image creation within the messaging app's process such as the plugin shown in FIGS. 5A, 5B, and 5C. The camera app icon 24 in one embodiment can, when selected, cause the communication device 10A to enter into a camera mode in which a camera of a device can capture still images or video images which can be placed into the message in order to send the image or video.

Figure 2:
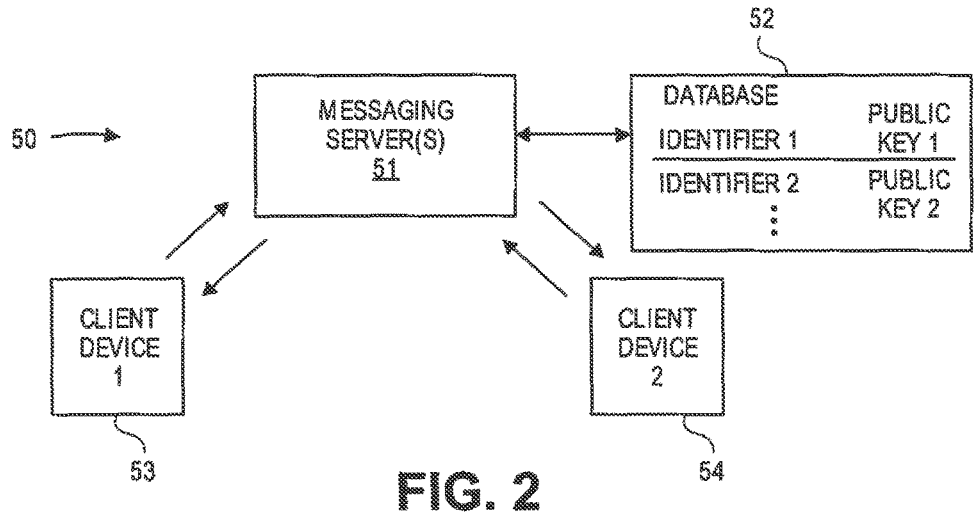
FIG. 2 shows an example of a messaging system which employs one or more messaging servers to provide a messaging service to a set of client devices.

A brief overview of an example of a messaging system will now be provided in conjunction with FIG. 2. A messaging system 50 can include a plurality of client devices, such as client devices 53 and 54. Each of these client devices can include at least one messaging app that is configured to operate with extension apps according to the one or more embodiments described herein and also communicate at least text messages and optionally resource locators or images or other content (e.g. as described relative to FIG. 13A) for devices that are not compatible with the extension app architecture in a messaging app. In a typical messaging system, there can be millions of client devices communicating through a set of messaging servers. In one embodiment, a plurality of messaging servers can be configured to receive encrypted messages from sending devices and then transmit those encrypted messages to the receiving devices. Another set of servers can be configured to receive non-text content, such as images or other "attachments" and provide those images or attachments in download operations to receiving devices in response to requests from those receiving devices to obtain the images or attachments. In one embodiment, a sender's outgoing message is individually encrypted for each of the receiver's devices. In one embodiment, an asymmetric RSA encryption algorithm can be used to perform the encryption. In one embodiment, the public RSA encryption keys of each of the receiving devices can be retrieved from a directory service (maintained by the one or more messaging servers) which includes a database, such as a database 52 which is coupled to the one or more messaging servers 51. When a client device, such as client device 53 seeks to send a message to another client device, it identifies the other client device (such as by an email address or a telephone number or other identifier) to the one or more messaging servers 51. That identifier is sent from the client device, such as client device 53 to one or more messaging servers 51 which then perform a lookup operation in the database 52 based upon the supplied identifier to retrieve the public key that corresponds to that identifier. That public key is then transmitted back to the client device which requested the public key for that particular receiving device, and then the client device can encrypt the message using the public key or using another key (e.g. a symmetric key) which can be randomly generated, and that other key is encrypted with the public RSA encryption key for the particular receiving device. In one embodiment, the randomly generated key can be randomly generated on a per message basis. In one embodiment, the resulting messages, one for each receiving device, consists of the encrypted message text, the encrypted message key, and the sender's digital signature, and this resulting message for each receiving device is then uploaded to the one or more messaging servers 51 for delivery to the recipient client devices, such as client device 54. In one embodiment, the messaging system 50 can be configured to operate through "public" networks which include public WiFi access points (such as WiFi access points in coffee shops, airports, etc.) and also the Internet. The messaging apps on each of the client devices 53 and 54 can also be configured to operate with the "private" networks provided by wireless cellular telephone carriers, such as Verizon and AT&T, and the messaging apps can be configured to seamlessly switch between the use of the private and public networks depending upon the availability of each and also depending upon the compatibility of each of the client devices in a messaging session. In one embodiment, the messaging servers 51 can include a set of push notification servers which receive the uploaded text messages and which "push" those text messages to receiving devices.

A messaging system in one embodiment on a client device includes a messaging app and one or more extension apps that each operate as separate processes. In one embodiment, the message app and the one or more extension apps can each be separate sandboxed processes that operate or execute in their own memory spaces. In addition, the messaging app can also operate with plug-ins, such as an image creation plug-in shown in FIG. 5A, which operate within the same process and memory space as the messaging app. The messaging app and each extension app communicate with each other through an interprocess communication, such as the XPC framework provided in iOS and Mac OS X. The messaging app is designed to receive text on a sending device from a user of the device and display the text in a message transcript and send the text, through a set of one or more messaging servers, to a receiving device which displays, through a counterpart messaging application on the receiving device, the received text in a message transcript on the receiving device. The receiving device and the sending device can each have a copy of the same extension app which are configured to create content of a certain type depending upon the particular extension app (or, in an alternative embodiment, each can include a copy of different extension apps that are compatible for the content used by them).

Figure 3A:
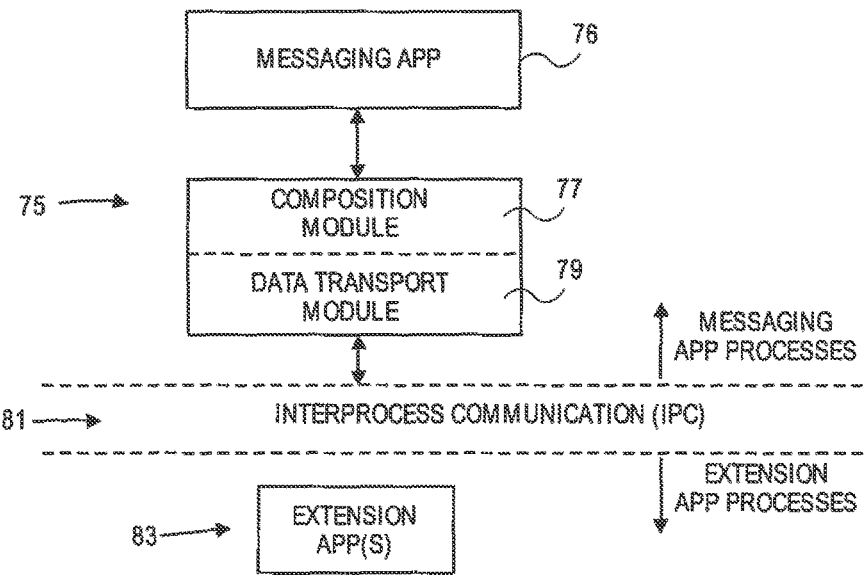
FIG. 3A shows a block diagram of an architecture for providing extension apps for use with a messaging app according to one embodiment.

FIG. 3A shows an example of a software architecture in which a messaging app and one or more extension apps operate together to provide an enhanced messaging system. As shown in FIG. 3A, the messaging system 75 includes a messaging app 76 and a set of plug-in modules, such as a composition module 77 and a data transport module 79 which are configured to communicate through an interprocess communication (IPC) 81 with the one or more extension apps 83. As shown in FIG. 3A, the messaging app and the composition module 77 and the data transport module 79 operate within the messaging app processes in a memory space controlled by a kernel on the communication device which executes the messaging system 75. The composition module 77 composes the content of a message bubble when the message bubble displays or otherwise presents content passed to the messaging app through the IPC 81. The data transport module 79 passes the content and other data to the extension app through the IPC 81 and receives the content and other data from the extension app through the IPC 81. Both modules 77 and 79 in one embodiment can have an extendable plug-in architecture that allows the addition of new plug-ins for new extension apps that generate new content or require a new data transport process. In this context, the plug-ins are additional software that operate within the same process as the messaging app. The composition module 77 can use a template to construct a message bubble such as the "MSMessageTemplateLayout" described below relative to FIG. 3C. The kernel can include a software library or software framework for providing the IPC 81 to allow communication between the messaging system 75 and the one or more extension apps 83. In one embodiment, the IPC framework can include a system area that is referred to as an extension point which provides APIs to allow for communication between the two different processes and to reinforce policies in terms of the types of communications which are permissible. In one embodiment, the communication through IPC involves the placement (writing) of content in a memory region by one process and the IPC framework allows another process to read from that memory region. In one embodiment, the messaging app 76 can launch automatically the extension app processes and can manage their lifetime, including the termination of those processes. In one embodiment, each of the extension apps 83 run in their own address space communication between the extension and the messaging app uses the IPC mediated by the system framework and they do not have access to each other's files or memory spaces. In one embodiment, each of the extension apps may be a sandboxed process which are separate from each other and the messaging app 76 can also be a separate sandboxed process which is separate from the sandboxed processes of the extension apps. Moreover, the extension apps can be provided with fewer system permissions relative to the messaging app so that the extension apps operate in a more restricted environment than the messaging app. Further information in connection with the use of interprocess communications for extensions can be found in U.S. patent application Ser. No. 14/488,122, filed Sep. 16, 2014 and published as U.S. Publication No. U.S. 2015/0347748, which application is incorporated herein by reference.

Figure 3B:
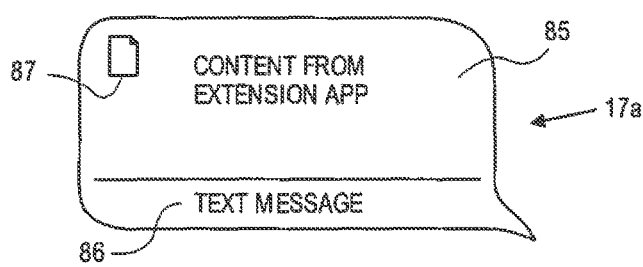
FIG. 3B shows an example of a user interface of a message bubble created at least in part by an extension app according to one embodiment herein.

In one embodiment the messaging app provides a view of content obtained from the extension app through the interprocess communication. The extension app can create the content in its own process and then provide that content in formats known to be acceptable to the messaging app (such as standard image formats or other standard formats). This allows the messaging app to then present the content from the extension app within one or more message bubbles within a message transcript (without needing to execute the extension app at least on the receiving device). FIG. 3B shows an example of a message bubble 17A which contains content created by and provided from an extension app, shown as content 85 which also can include a text message created by or provided by the extension app, such as text message 86. In one embodiment, the message bubble 17A can also include an icon 87 which can be the icon of the extension app which created the content 85.

Objects created by an extension app in one embodiment are shown in the message transcript on sending and receiving devices without launching the extension app. The extension app should provide enough information to construct a message bubble as part of the object. The object can consist of some opaque data encoded in a resource locator and a layout specification provided as a MSMessageTemplateLayout object. MSMessageTemplateLayout is a subclass of MSMessageLayout and represents one method of specifying message bubble layout.

Figure 3C:
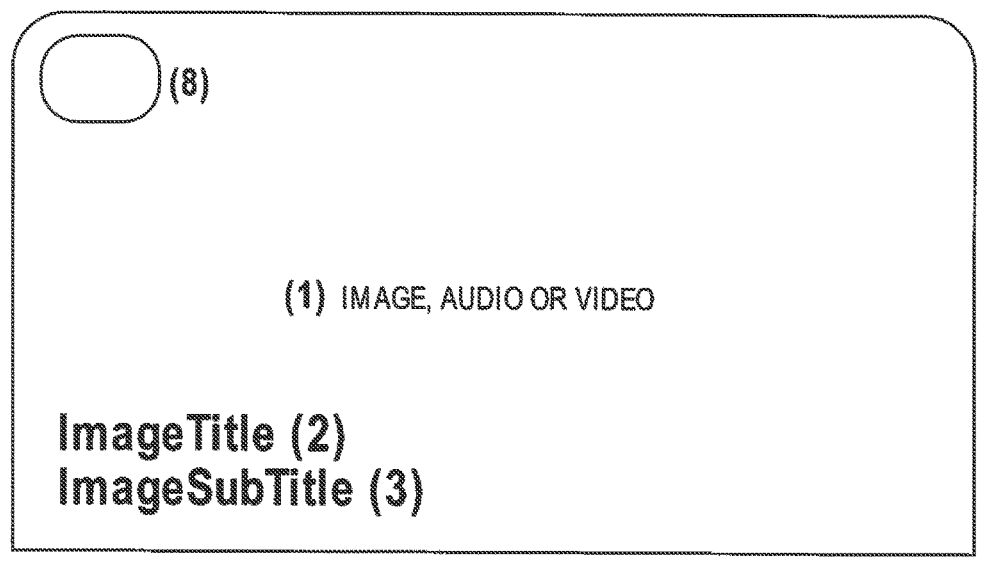
FIG. 3C shows an example of parts of a message bubble based on a template.

MSMessageTemplateLayout can have the following properties in one embodiment which are shown in FIG. 3C:

1) image or mediaFileURL: An image provide as a UIImage or as a file URL to an image file or a file URL to a video 2) imageTitle: A string the will be rendered on top of the image or movie 3) imageSubTitle: A string the will be rendered on top of the image or movie below the imageTitle 4) caption: A string the will be rendered in a caption bar below the image or movie 5) trailingCaption: A string the will be rendered right aligned in a caption bar below the image or movie 6) subCaption: A string the will be rendered in a caption bar below the caption 7) trailingSubCaption: A string the will be rendered right aligned in a caption bar below the trailingCaption 8) Extension icon: This is not provided as part of the MSMessageTemplateLayout but is derived from the bundle identifier of the extension that created the MSMessage.

The messaging app can use this information to construct the message bubble similar to the example shown in FIG. 3C.

The MSMessageTemplateLayout is serialized and transferred to the remote devices along with the opaque data. On receipt the messaging app on the receiving device will create a MSMessageTemplateLayout using the serialized data and use this to draw the message bubble in the receiver's message transcript.

In one embodiment, the extension apps which are configured to operate with a messaging app are not executable outside of the messaging application, and thus their life cycle is managed entirely by the messaging app. Moreover, as further described below, the downloading and installing of the extension apps can be controlled exclusively by the messaging app in one embodiment.

Figure 4A:
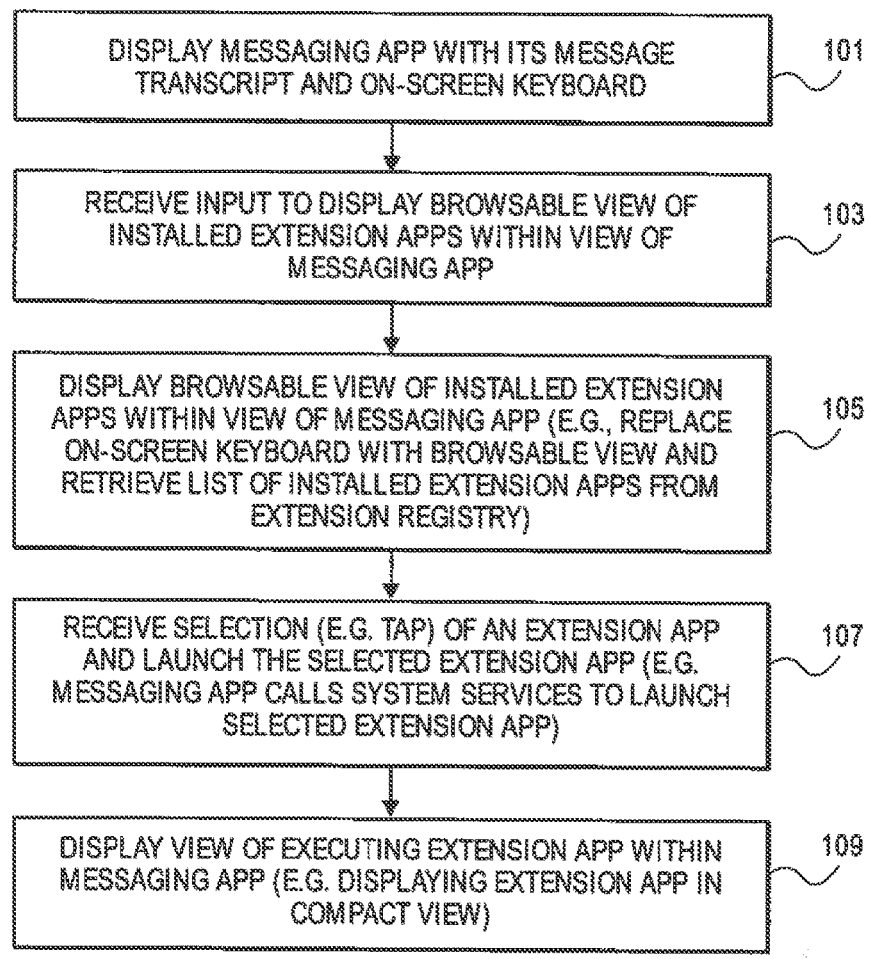
FIG. 4A is a flowchart which shows a method according to one embodiment for browsing, selecting, and launching an extension app from within a messaging app according to one or more embodiments described herein.
Figure 4B:
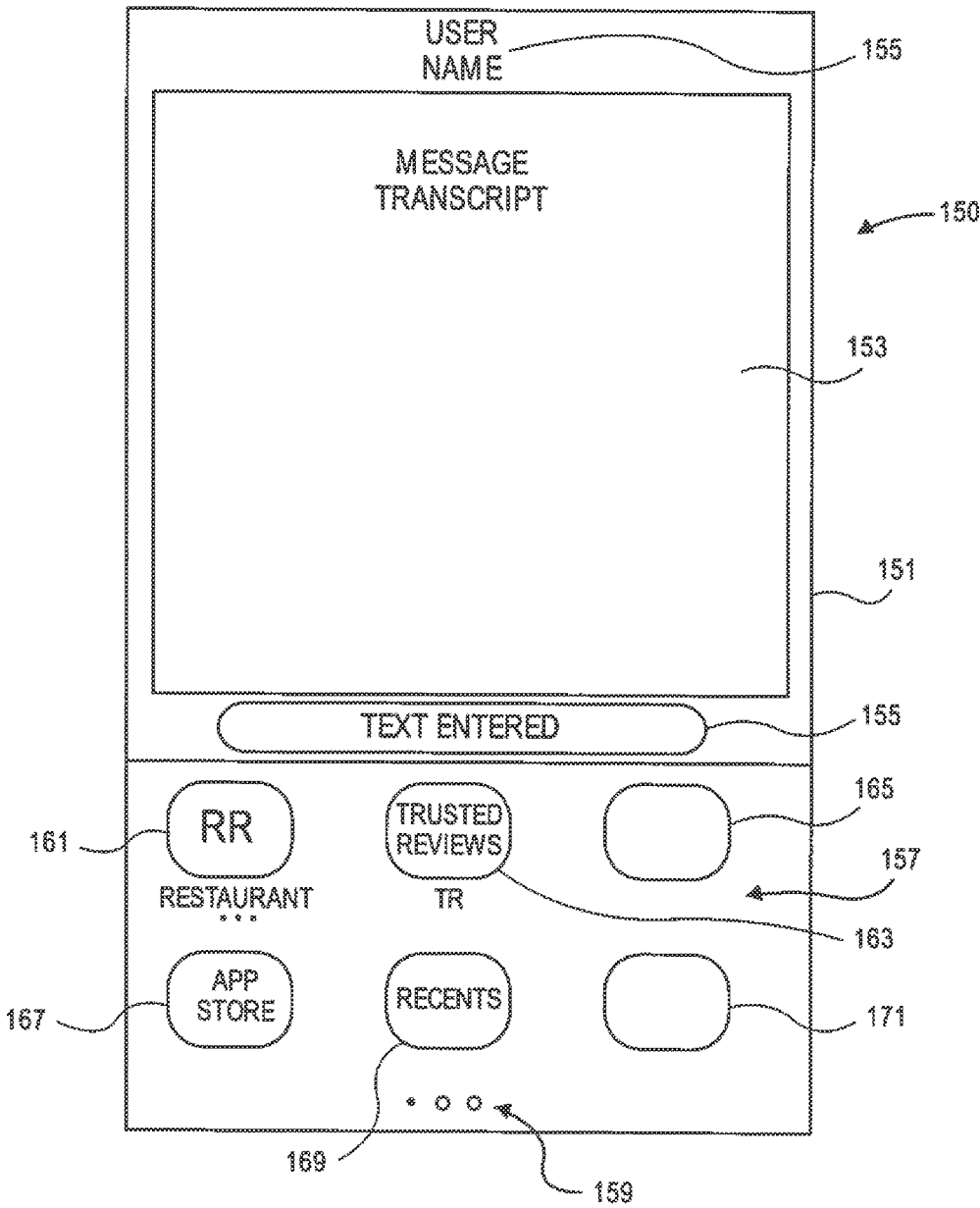
FIG. 4B shows an example of a user interface for a messaging app which includes a browsable view of installed extension apps according to one embodiment described herein.

In one embodiment, each extension app can be obtained from an app marketplace or distribution facility such as the Apple App Store (trademark) for message extension apps and can be launched from within the messaging app. FIG. 4A shows an example of a method according to one embodiment in which the installed extension apps can be browsed from within the messaging app, and a particular extension app can be launched to allow the user to interact with a particular extension app. The method can begin in operation 101 in which the messaging app displays its message transcript and an on-screen keyboard. FIG. 1B shows an example of a user interface of such a messaging app. Then in operation 103, the messaging app can receive an input to display a browsable view of installed extension apps within a view of the messaging app. For example, a user may tap on the icon 22 (in FIG. 1B) to select the icon which in turn causes the display of the browsable view in operation 105. In one embodiment, the browsable view of installed extension apps takes the place of the on-screen keyboard and retrieves the list of the installed extension apps from an extension registry which causes the display of icons for each of the installed extension apps. FIG. 4B shows an example of the result of operation 105 in which a browsable view 157 is displayed and takes the place of the on-screen keyboard of the messaging app as shown in FIG. 4B.

Figure 14A:
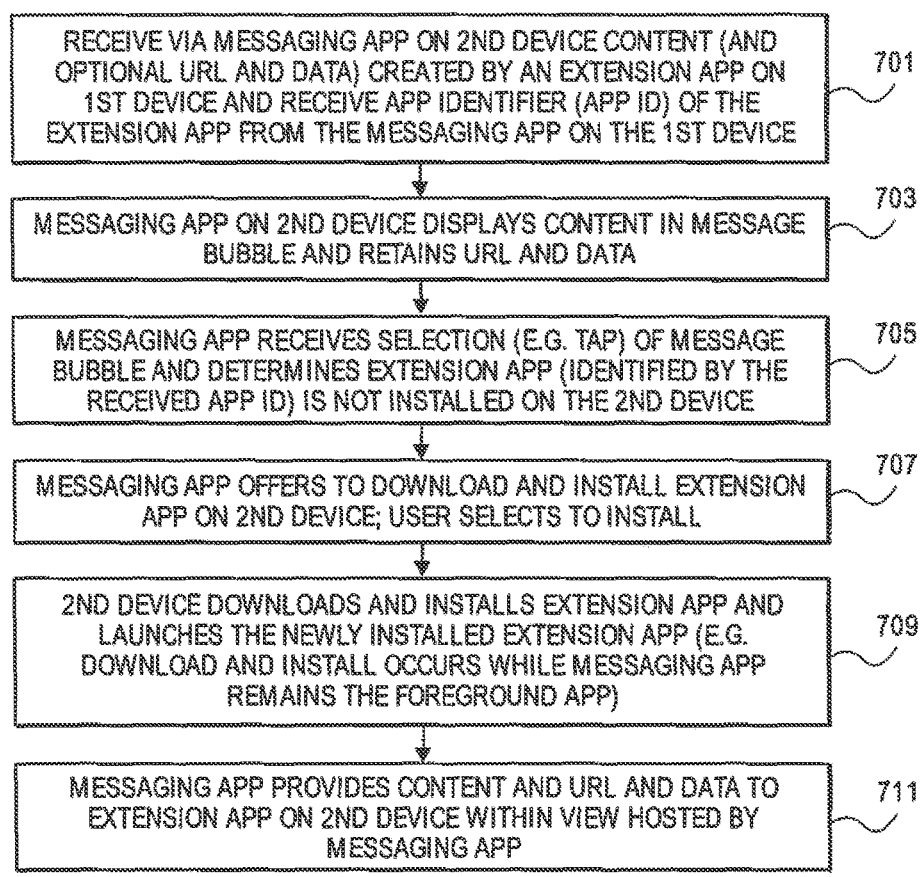
FIG. 14A shows a method according to one embodiment in which a receiving device (which has received a message) downloads and installs an extension app required to view or interact with the content in one of the messages.
Figure 14B:
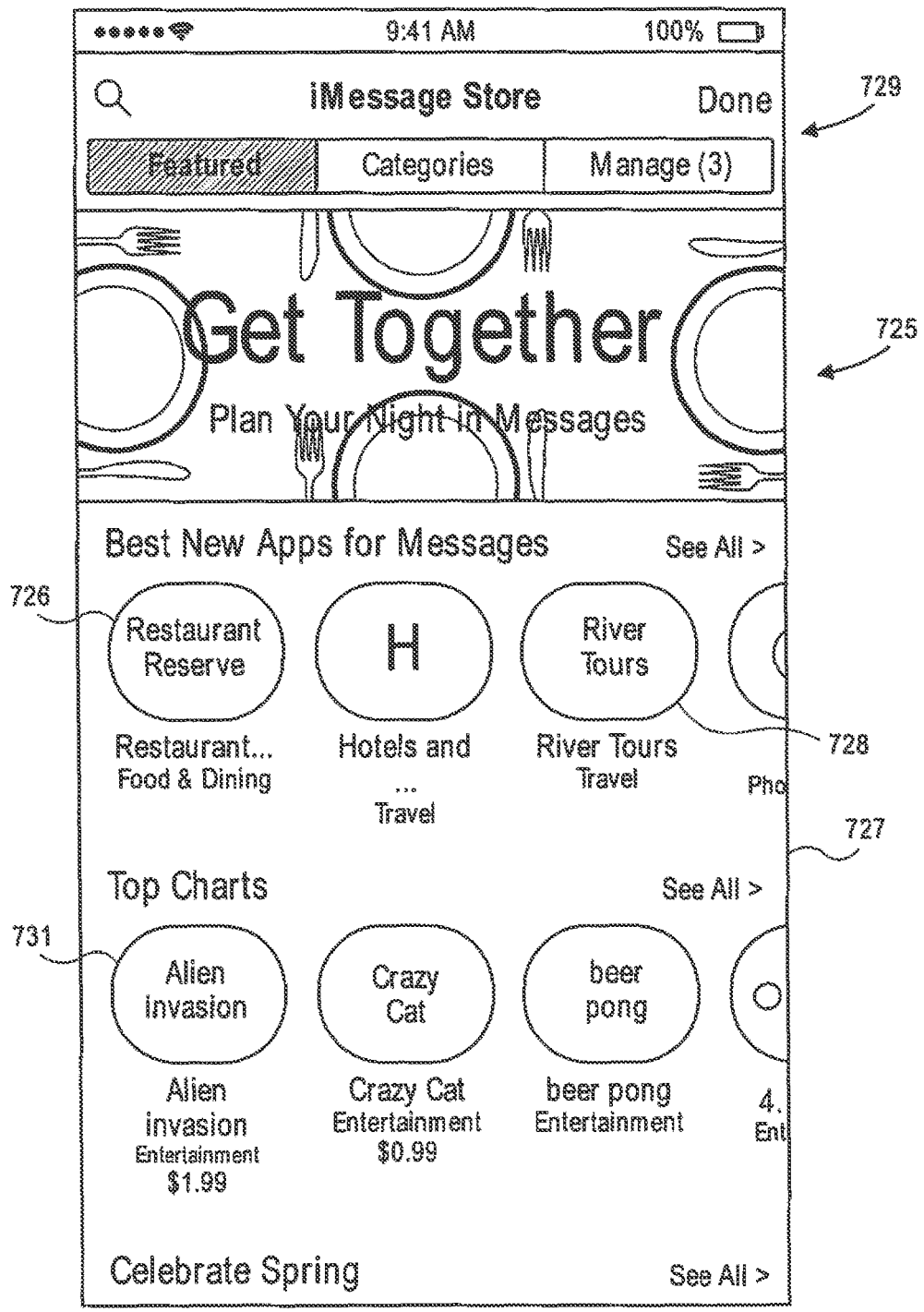
FIG. 14B shows an example of a user interface of an extension app marketplace or service from which extension apps can be downloaded and installed.

Referring to FIG. 4B, it can be seen that the browsable view 157 includes a plurality of icons each representing one of the installed extension apps that can operate with the messaging app that provides the user interface shown in FIG. 4B. The user interface of the messaging app shown in FIG. 4B includes a message transcript 153 shown in the upper portion of the touch screen 151 on the communication device 150 which executes the messaging app. A user name 155 of the other user (recipient of messages sent from communication device 150) is shown at the top of the user interface of the messaging app. A text entry region 155 (which shows text or other content that is staged or ready to be sent) is displayed between the message transcript 153 and the browsable view 157. In one embodiment, the browsable view is browsable by swiping the user's finger across the touch screen to cause the pages in the various views of installed extension apps to be displayed (and in one embodiment, can also show, for example, uninstalled extension apps that either need to complete a download process or need to complete an install process). In one embodiment, a page indicator 159 at the bottom of the user interface can show the current page of installed extension apps. In one embodiment, one of the icons can be reserved to launch or enter the extension app marketplace, an example of which is shown in FIG. 14B. In another embodiment the extension app marketplace can be displayed in the browsable view 157 in response to selecting icon 167. In the embodiment shown in FIG. 4B, the icon 167 is the extension app marketplace icon which can be selected to cause the presentation of the extension app marketplace, such as the extension app marketplace shown in FIG. 14B. In the embodiment shown in FIG. 4B, the icon 169 can be selected (e.g. user taps icon 169) to cause the display in the browsable view of recently sent stickers or handwritten messages or other recently sent items or recently used apps, etc. The display of recently sent items, etc. can in one embodiment be provided by a plug-in operating within the messaging app's process. Other extension apps include a restaurant reservation app icon 161 which can be an extension app that can be used to engage a restaurant reservation service, such as Open Table. Another example of an extension app is represented by icon 163 which when selected launches a restaurant review app which provides reviews of restaurants and which can be similar to the reviews provided by Yelp, for example. The other extension app icons 165 and 171 represent other extension apps which are installed and which can be launched by selecting one of those extension app icons.

Referring back to FIG. 4A, once the browsable view is displayed by operation 105, the user can select one of the extension apps by selecting the corresponding icon which in turn causes the launching of the selected extension app in operation 107. In one embodiment, the messaging app calls a system service to launch the selected extension app and prepare it for execution as an extension of the messaging app using the architecture shown, for example, in FIG. 3A. Once the selected extension app has been launched and is executing, the messaging app, such as messaging app 76 can host the view of the content provided by the executing extension app through the IPC framework as described herein. For example, in operation 109 shown in FIG. 4A, the messaging app can display a view of the content provided by the extension app within a portion of the view of the messaging app. FIGS. 5A through 5F will now be described as examples of how the messaging app hosts the view of the content of the executing extension app.

Figure 5A:
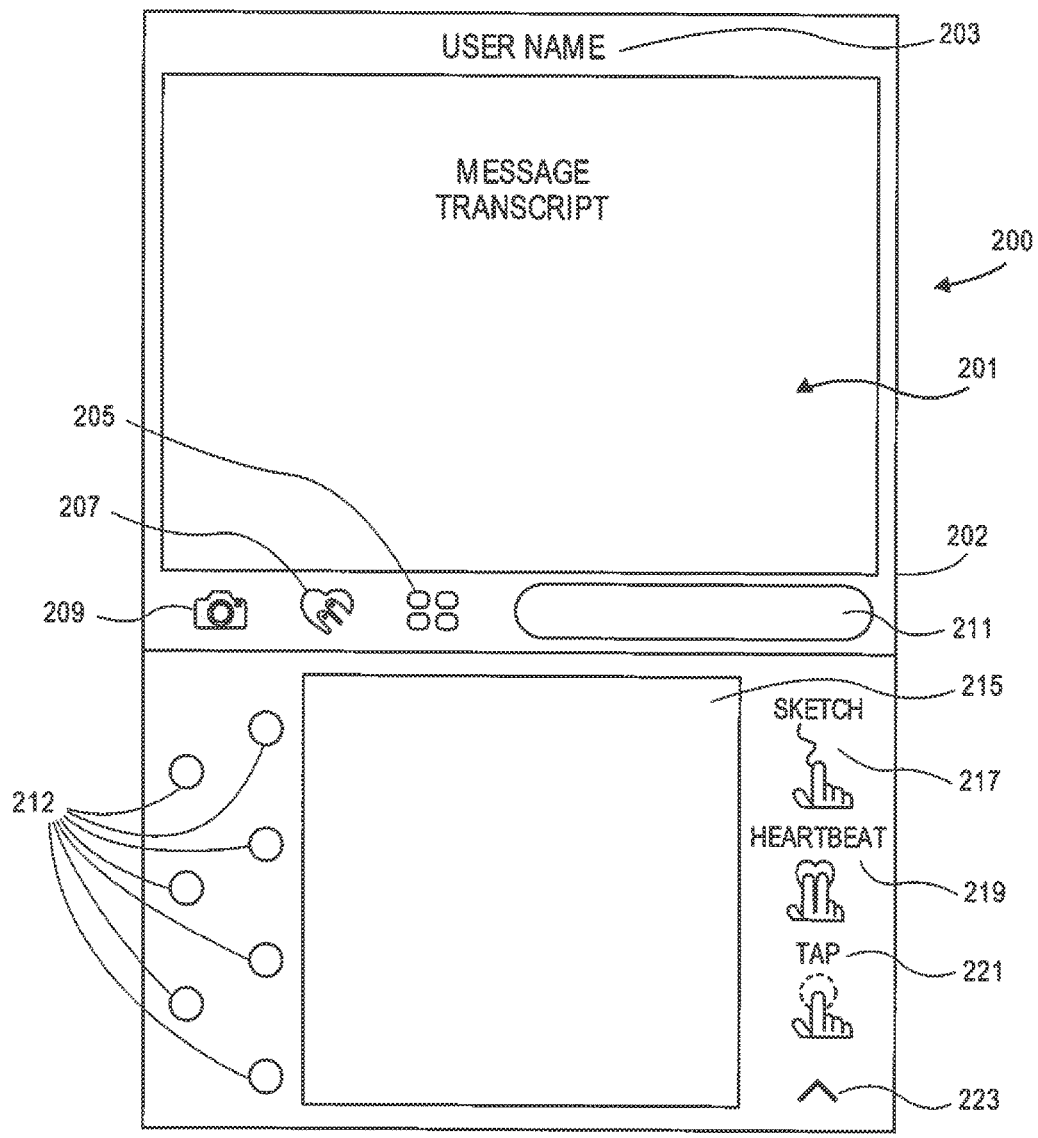
FIG. 5A shows an example of a user interface of a messaging app which includes a view of an extension app within the user interface of the messaging app.
Figure 5B:
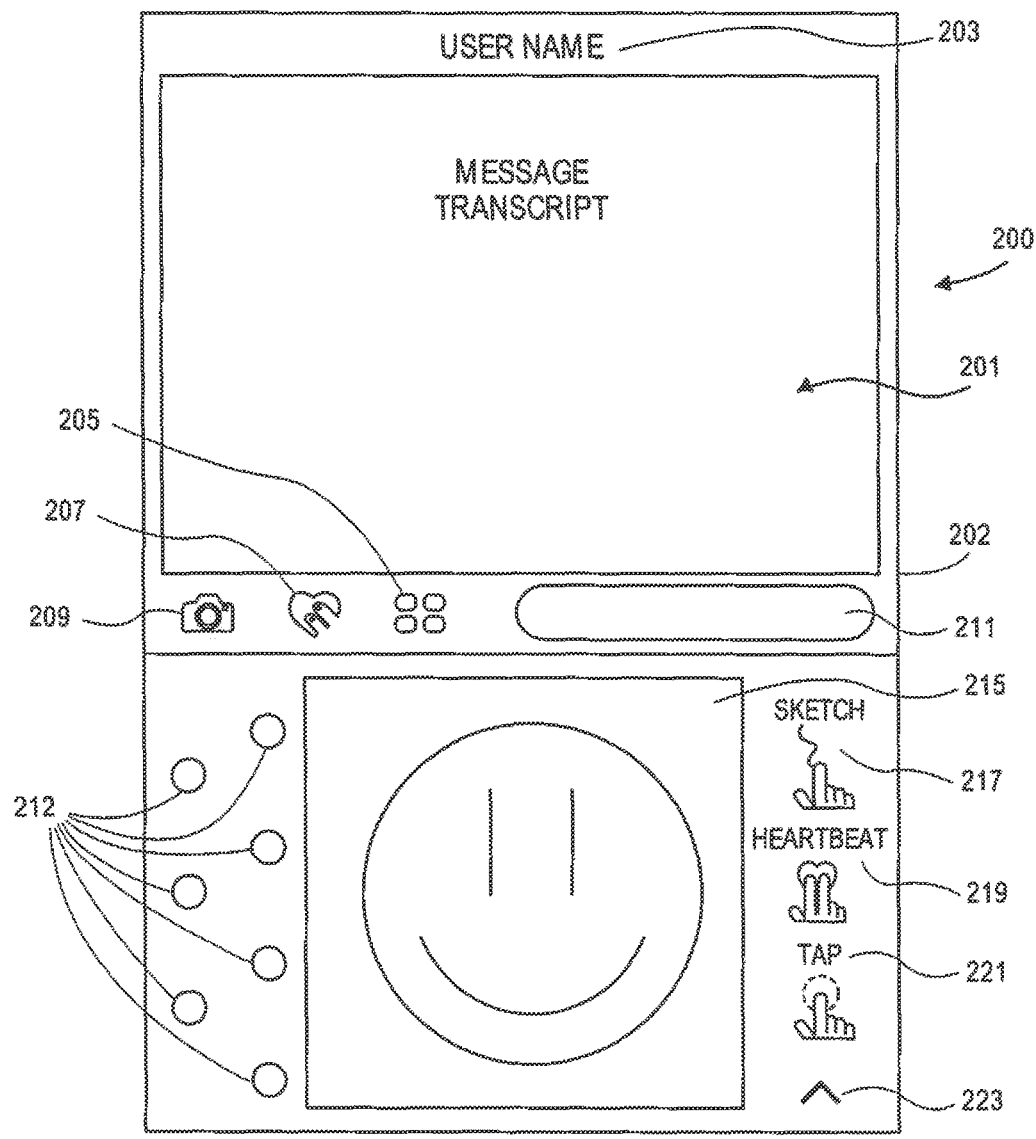
FIG. 5B shows an example of a user interface of an extension app, after the user has created content in the extension app, wherein the view of the extension app is hosted within the user interface of the messaging app.
Figure 5C:
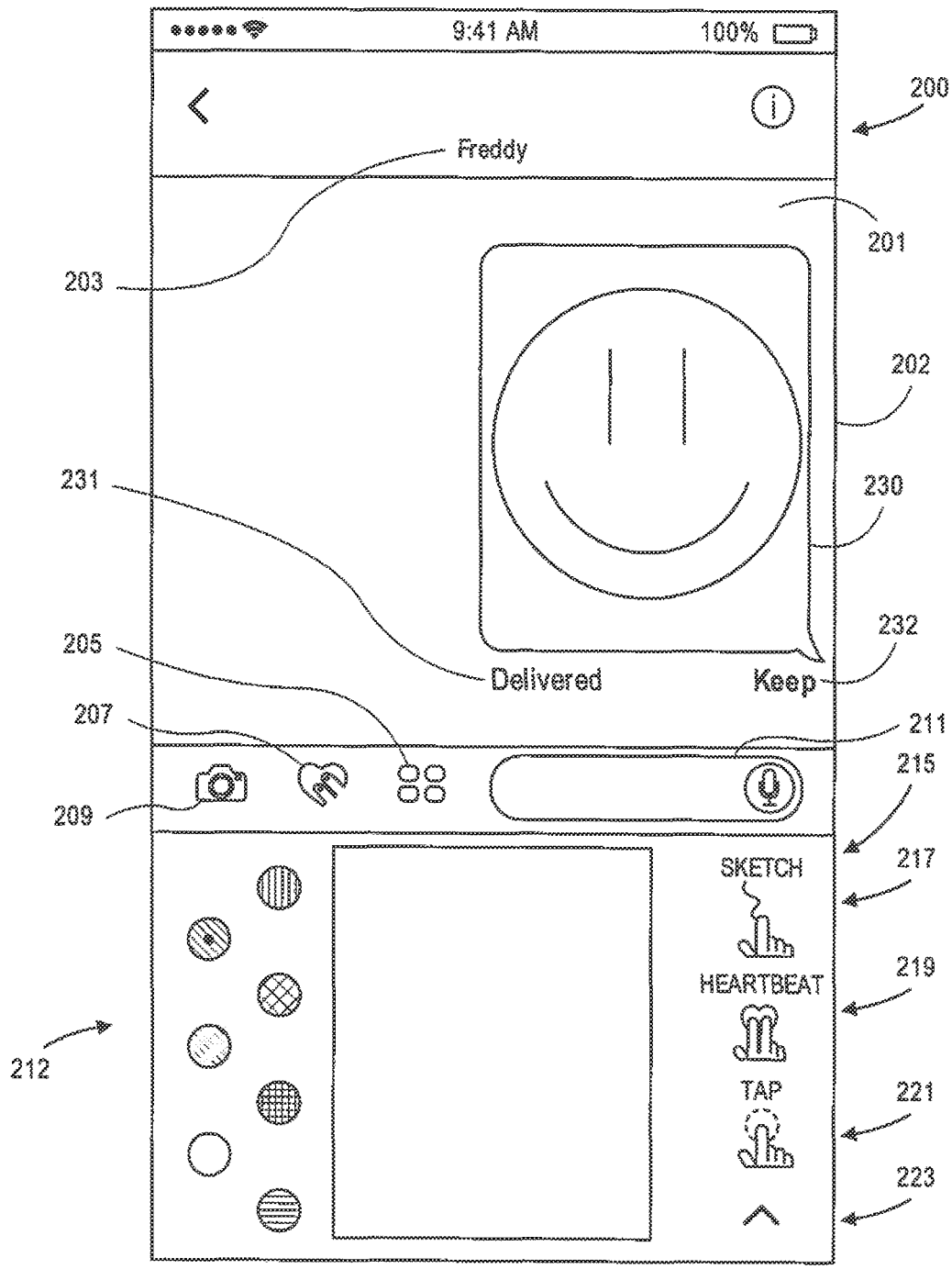
FIG. 5C shows an example of a user interface of a messaging app on a communication device after the user has created content using an extension app and has sent the content by using the messaging app to send the content.

FIG. 5A shows an example of a messaging app that hosts a view of a plug-in of a messaging app that is an image creation app launched by selecting the icon 207 (e.g. icon 207 is touched or tapped or otherwise selected by a user). In another embodiment, the plug-in shown in the bottom portion of the user interface shown in FIG. 5A may be launched by selecting one of the icons in the browsable view 157 shown in FIG. 4B. While the example shown in FIG. 5A can be implemented as a plug-in of the messaging app, in another embodiment, the example shown in FIG. 5A can be an extension app. In the example shown in FIG. 5A, the view of the plug-in (or extension app) has taken the place of the on-screen keyboard of the messaging app, but the message transcript of the messaging app is still viewable and displayed in the user interface, allowing the user to scroll through the message transcript in one embodiment to see the entire transcript. In another embodiment, the view of the plug-in or extension app is an overlay on top of the on-screen keyboard, a portion of which may be viewable. The transcript is displayed on the touchscreen 202 in one embodiment on the communication device 200. The user interface of the message app also includes the user name 203 which presents in one embodiment the name of the other user in the conversation or chat. The user interface of the message app also includes the text entry region 211 which is similar to the text entry region 18A and the text entry region 155. The plug-in (or extension app) includes a drawing canvas 215 and various controls and options which can be selected by the user to draw or create images. Drawing controls 212 in one embodiment can allow the users to select different colors to sketch on the drawing canvas if the sketch option 217 is selected. The plug-in (or extension app) can also provide taps as a message if the tap option 221 is selected. The plug-in (or extension app) can also provide heartbeats if the heartbeat option 219 is selected. In one embodiment, the sketch, heartbeat, and taps can be similar to the sketch, heartbeat and taps on the Digital Touch application which is available on the Apple Watch. The plug-in (or extension app) also includes an expanded view icon 223 which when selected can cause the plug-in (or extension app) to switch from its current compact view shown in FIG. 5A to an expanded view, such as the expanded view shown in FIG. 7B. In the example shown in FIG. 5A, the user has just launched the plug-in image creation app (or an extension app in the alternative embodiment) and has not yet created any content. This can be contrasted with the state of the plug-in (or extension app) shown in FIG. 5B in which the user has created a happy face sketch by using the sketch option 217 and by drawing on the drawing canvas 215 with, for example, the user's finger. The user can then cause the drawing to be sent to the other user (or users) who would be recipients for the message. Thus for example, the user of the device 200 can select a send command from within the messaging app executing on communication device 200 to cause the content created by the plug-in (or extension app) to be sent to the recipients. The result of the sending operation is shown in FIG. 5C in which the happy face has been sent to Freddy as indicated by the user name 203. The message bubble 230 shows the happy face sketch that was created by the plug-in (or extension app); in the case of the extension app, this created content was communicated from the extension app through the IPC frame work to the messaging app and then presented within the message bubble 230 to show that the message containing that content was transmitted to one or more recipients. In one embodiment, a delivery indicator 231 can indicate that the message was delivered and a keep control 232 can be provided to the user to allow the user to retain the content in the message transcript in those embodiments in which the content can be automatically eliminated after a period of time.

Figure 5D:
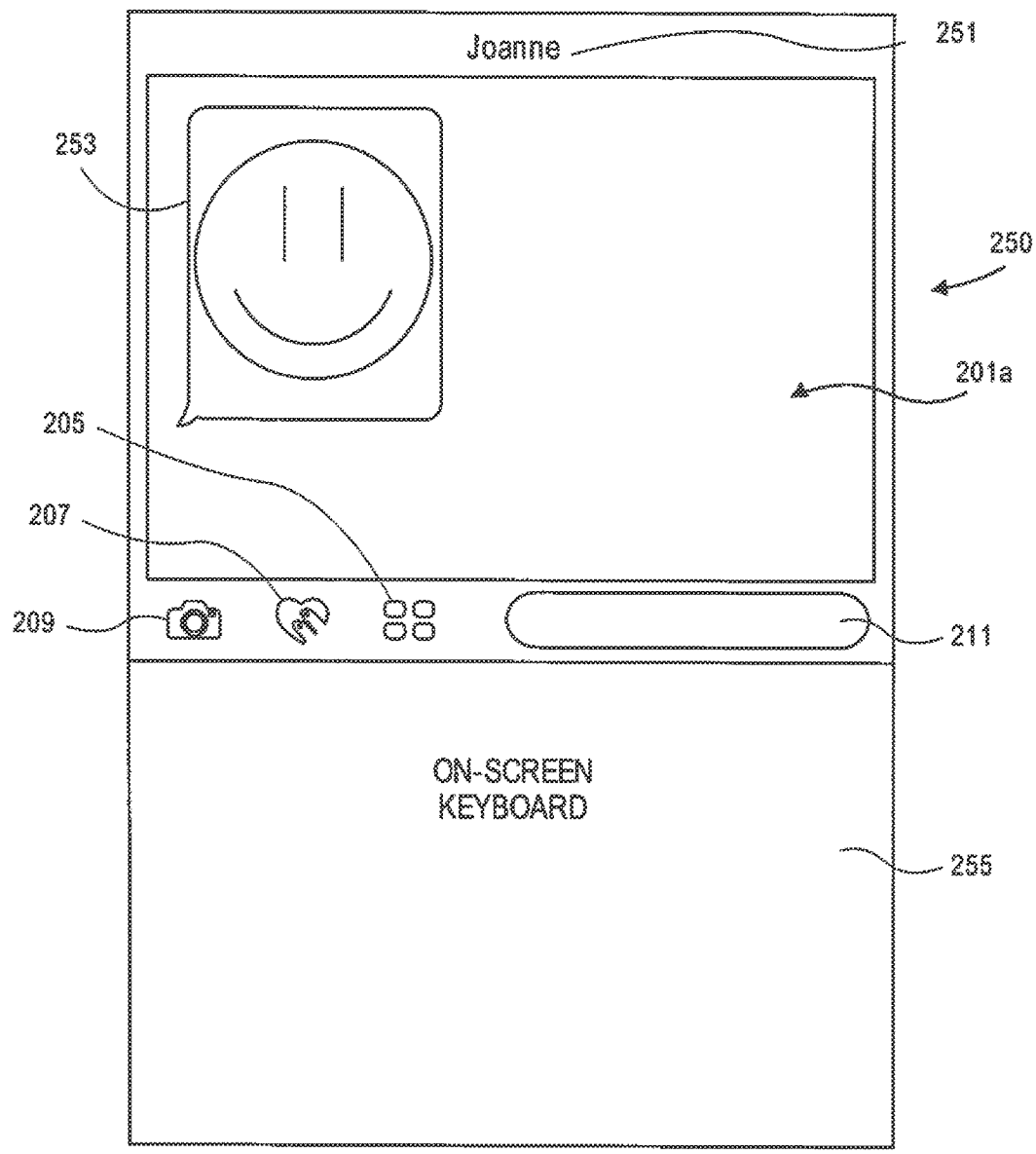
FIG. 5D shows an example of a user interface in a messaging app on a receiving device after the receiving device receives content created by an extension app on the sending device.
Figure 5E:
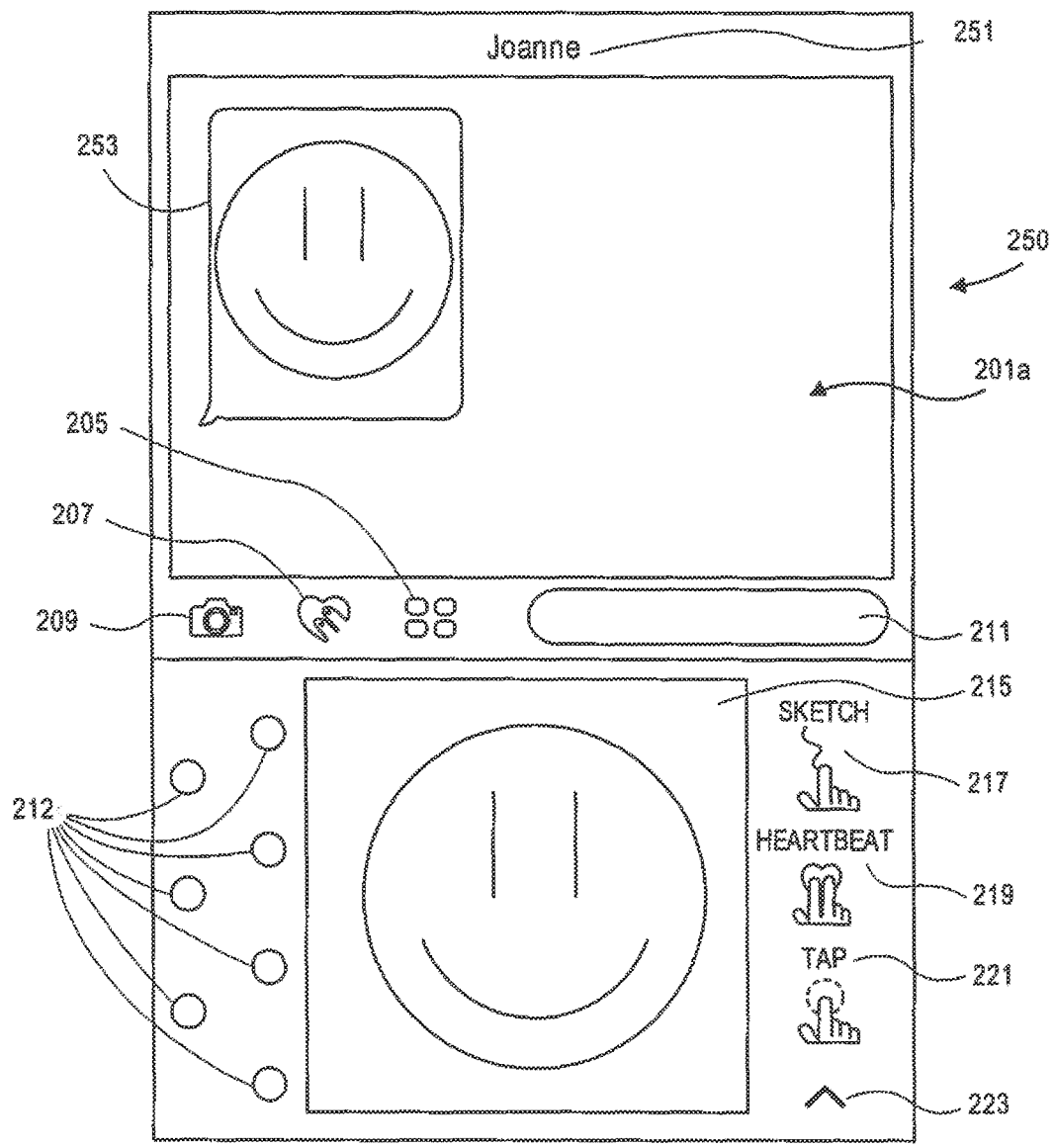
FIG. 5E shows an example of a user interface on a receiving device when the user of the receiving device selects the message bubble containing the content created by the extension app on the sending device so that the user of the receiving device can edit the content on the receiving device.
Figure 5F:
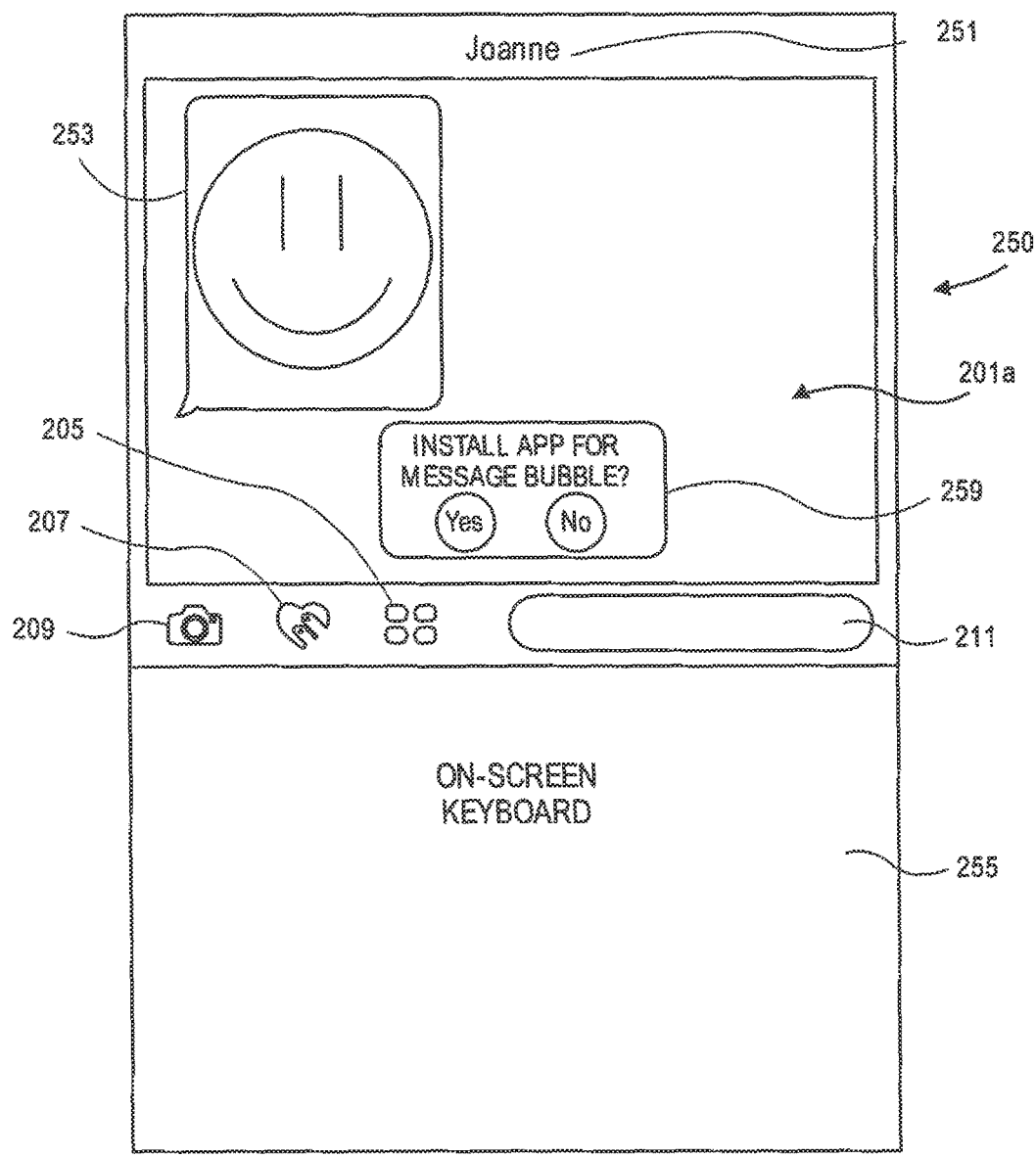
FIG. 5F shows an example of a user interface which offers to download and install an extension app for use with the messaging app on the device.

FIGS. 5D, 5E, and 5F illustrate what can happen on the receiver's device in response to receiving the content from the communication device 200 shown in FIG. 5C. Also, the flowchart shown in FIG. 6 can show the method performed at the receiving device, such as the communication device 250 shown in FIGS. 5D, 5E, and 5F. Referring now to FIG. 5D, it can be seen that the communication device 250 (used by Freddy) has received the happy face content which is shown in message bubble 253. This content was created by the extension app executing on communication device 200 which provided the happy face content to the messaging app executing on communication device 200 which in turn transmitted that content through a messaging service (e.g., a set of messaging servers, such as the messaging servers 51 shown in FIG. 2) to the messaging app executing on the communication device 250 which in turn presented the content in the message bubble 253. In one embodiment, the content can be rendered by the messaging app as it uses known standard formats (including standard image, audio, and video formats in one embodiment) and thus the extension app need not be installed or executing in order to show the content created by the counterpart (remote) extension application on the sending device. Thus in this case as shown in FIG. 5D, the message bubble 253 can present the content even though the counterpart extension application may not be executed or may not even be installed on the communication device 250. The messaging app shown in FIG. 5D includes, in its user interface, a message transcript 201A, a text entry region 211, and an on-screen keyboard 255. In one embodiment, content received from a remote extension app will not cause the launching automatically of the corresponding extension app on the receiving device even if the corresponding extension app is installed. In this embodiment, the corresponding extension app on the receiving device can be launched by the user's selection of the message bubble containing the content created by the remote extension app. If the user does select that content by, for example, touching or otherwise selecting the message bubble 253, then the extension app that corresponds to the remote extension app will be launched if installed on the communication device 250. The result is shown in FIG. 5E in which the user interface of the extension app has occupied the space in which the on-screen keyboard 255 was previously displayed and shows the happy face drawing within the canvas 215 allowing the user of the communication device 250 to alter or otherwise modify that sketch and perhaps send it back to the other user in the chat session or conversation. If, on the other hand, the corresponding extension app is not installed on the communication device, then in one embodiment the messaging app can present a notice to the user asking or offering to install the app for the particular message bubble which was selected. An example of this is shown in FIG. 5F in which the notice 259 includes two user selectable options, one of which will install the required app for the message bubble. In another embodiment, a sheet that shows a page of information from an extension app marketplace can be displayed within the view of the messaging app.

In one embodiment, the message transmitted from the remote device to the communication device 250 contains metadata which specifies the remote extension app used to create the content. In one embodiment, this metadata can be an app identifier, such as an identifier provided by an app marketplace or an extension app marketplace from which the extension apps can be downloaded and installed or can be a different identifier that can be associated with the identifier used by the app marketplace. In one embodiment, the notice 259 can result from the selection of the message bubble 253, while in another embodiment it can result automatically if the app identifier in the metadata for the content is not installed when the content for the message bubble 253 is received by the communication device 250.

Figure 6:
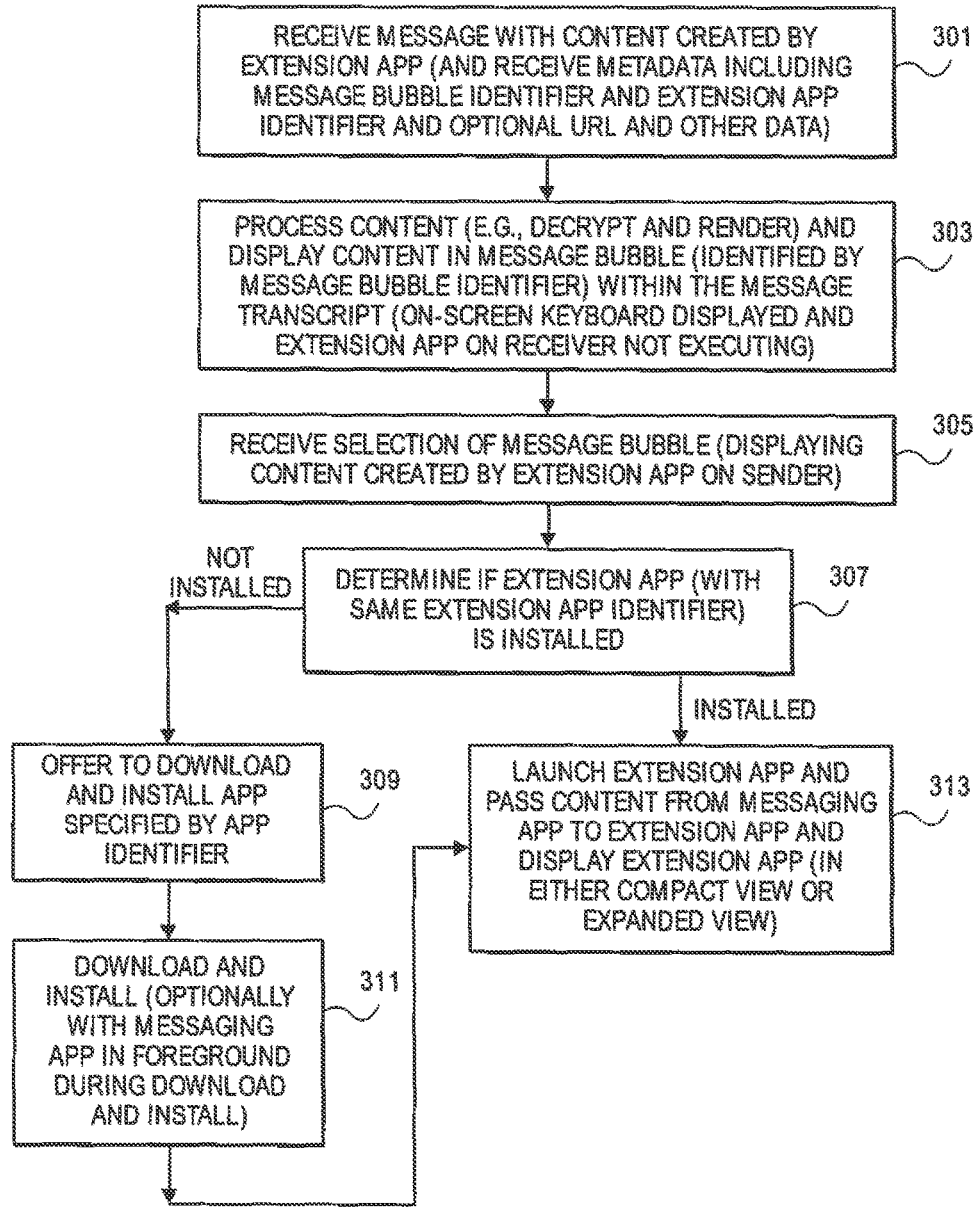
FIG. 6 is a flowchart which illustrates a method which can be performed on a receiving device according to one embodiment described herein.

FIG. 6 will now be referred to in conjunction with FIGS. 5D, 5E, and 5F to explain a method in one embodiment in which a receiving device processes content created by a remote extension app, such as the remote extension app executing in conjunction with the messaging app on communication device 200. In operation 301, a communication device can receive a message with content created by an extension app, such as a remote extension app operating in conjunction with a messaging app on a sending device. In addition, the communication device can also receive the metadata which can include a message bubble identifier, session identifier and an extension app identifier and potentially other data such as an optional resource locator and other data (state information) that may be associated with the optional resource locator and the resource locator may also include state information that is encoded into the resource locator. Further information with respect to the use of resource locators and data associated with the resource locators will be provided in conjunction with FIGS. 8, 9A, and 9B. Then in operation 303, the communication device which has received the message in operation 301 processes the content and displays the content in a message bubble which was identified by the message bubble identifier, and the message bubble is displayed within the message transcript. In one embodiment the processing of the content can include decrypting the content and rendering the content for presentation and display within the message bubble. In one embodiment, the content is displayed by the messaging app without assistance from the extension app; in other words, the extension app may not be installed or if installed is not executing on the communication device, and hence the on-screen keyboard is displayed in one embodiment. Then in operation 305 the communication device receives a selection of the message bubble displaying the content created by the remote extension app. In one embodiment, referring to FIG. 5D, the user can tap on the message bubble on a touchscreen or otherwise select (e.g. user uses a stylus on a touchscreen or uses a mouse with a desktop computer, etc.) the message bubble 253 to cause the selection in operation 305. In response to operation 305, the communication device, such as communication device 250 determines in operation 307 whether or not the extension app is installed. This can be performed in one embodiment by examining a list or registration of installed extension apps maintained by the messaging app. In one embodiment, the metadata received in operation 301 includes the app identifier, and the messaging app in operation 307 searches the list to determine whether the identifier is present in the list. If the identifier is not present in the list then the messaging app determines that the extension app is not installed, thereby causing the communication device to perform operation 309 in which the notice 259, shown in FIG. 5F, can be displayed to the user to offer to download and install the app specified by the app identifier which was received as part of the metadata in operation 301. If the user selects the option "yes" then operation 311 is performed in which the messaging app causes the communication device to access the extension app marketplace (such as the extension app marketplace having a user interface shown in FIG. 14B) to retrieve through a download process a copy of the extension app and to cause the extension app to be installed. In one embodiment, operation 311 may be performed entirely in the background so that the messaging app remains the foreground app during the download and install process. FIG. 9C shows an example of a message bubble 471 maintained in a message transcript during the download and install process, where the message bubble includes a progress bar 473 which indicates the progress of the download and install operation while the messaging app remains the foreground application displaying the message bubble 471 in the message transcript of the messaging app. In another embodiment of the operation 311, a sheet that shows a page of information from an extension app marketplace can be displayed over the messaging app (with a portion of the messaging app optionally still displayed), and the sheet can show a "buy" or install or download button, which if selected, can cause the download and installation of the extension app, and the sheet can be dismissed (removed from display) either by selecting a dismiss command or by selecting buy or install or download. After downloading and installing the extension app, processing can proceed to operation 313 in FIG. 6 in which the extension app is launched and the content and other data used or created by the remote extension app is passed (via IPC) to the extension app by the messaging app, and the extension app is displayed in either a compact or expanded view in one embodiment and the content created by the remote extension app is displayed within that view. As shown in FIG. 6, operation 313 also follows operation 307 if operation 307 determines that the extension app is installed. FIG. 5E shows one example of the result of operation 313.

In one embodiment, a messaging app can launch different types of extension apps in different ways depending upon the type of the extension app. For example, one type of extension app can be launched automatically in response to receipt of a message bubble containing content from an extension app having a certain predetermined type. Other extension apps having a different type may only be launched in one embodiment in response to the selection of a message bubble containing content from that extension app or by the selection of an icon representing the extension app in a browsable view, such as browsable view 571. It may be desirable to allow certain extension apps having a certain type to be launched automatically in response to receiving content that is displayed within the message transcript while not automatically launching other types of extension apps. In another alternative embodiment, one or more extension apps can be permitted to execute in the background and can be allowed to update their respective user interfaces that are presented in their respective message bubbles.

In an alternative embodiment, the metadata can include a format or extension identifier such as an identifier of an image format that can be used to determine available extension apps that can process that image format on the receiving device.

Figure 7A:
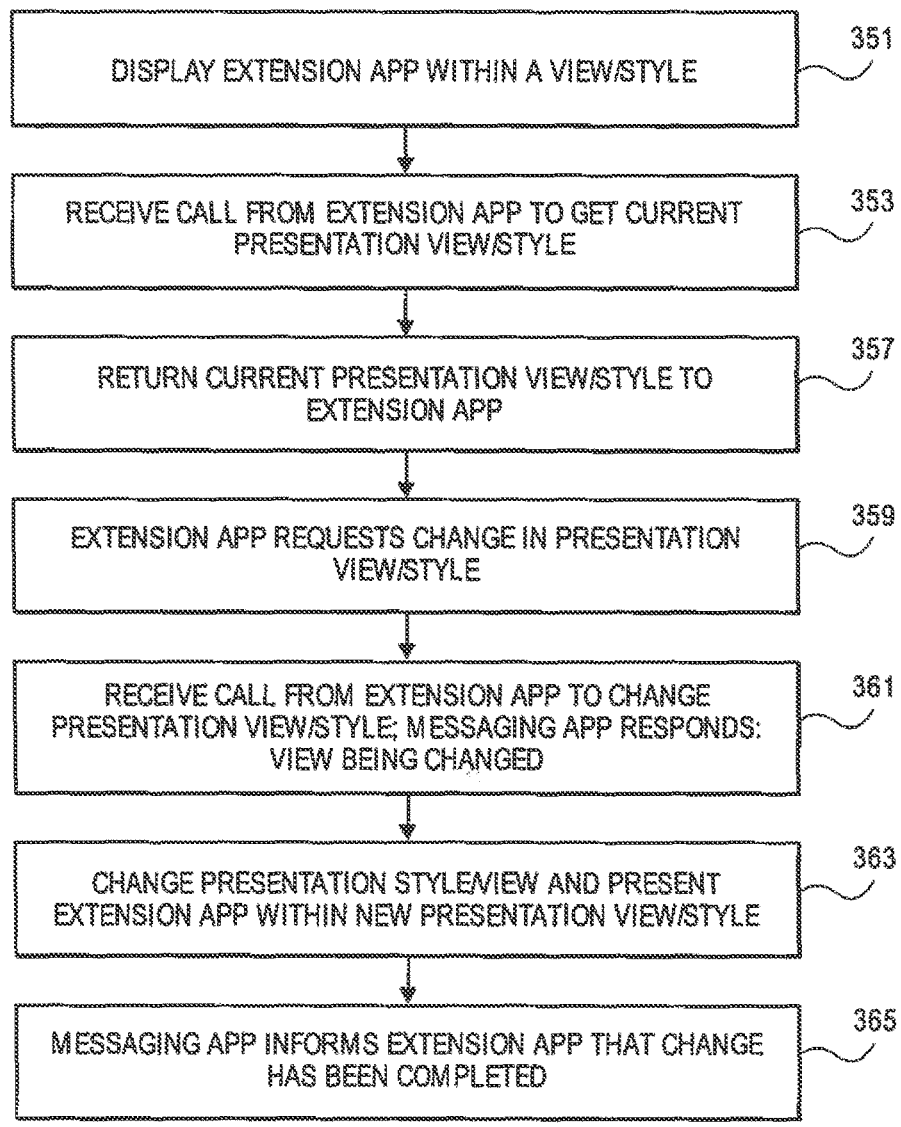
FIG. 7A is a flowchart which depicts a method according to one embodiment in which an extension app can change its view hosted by a messaging app according to one embodiment.
Figure 7B:
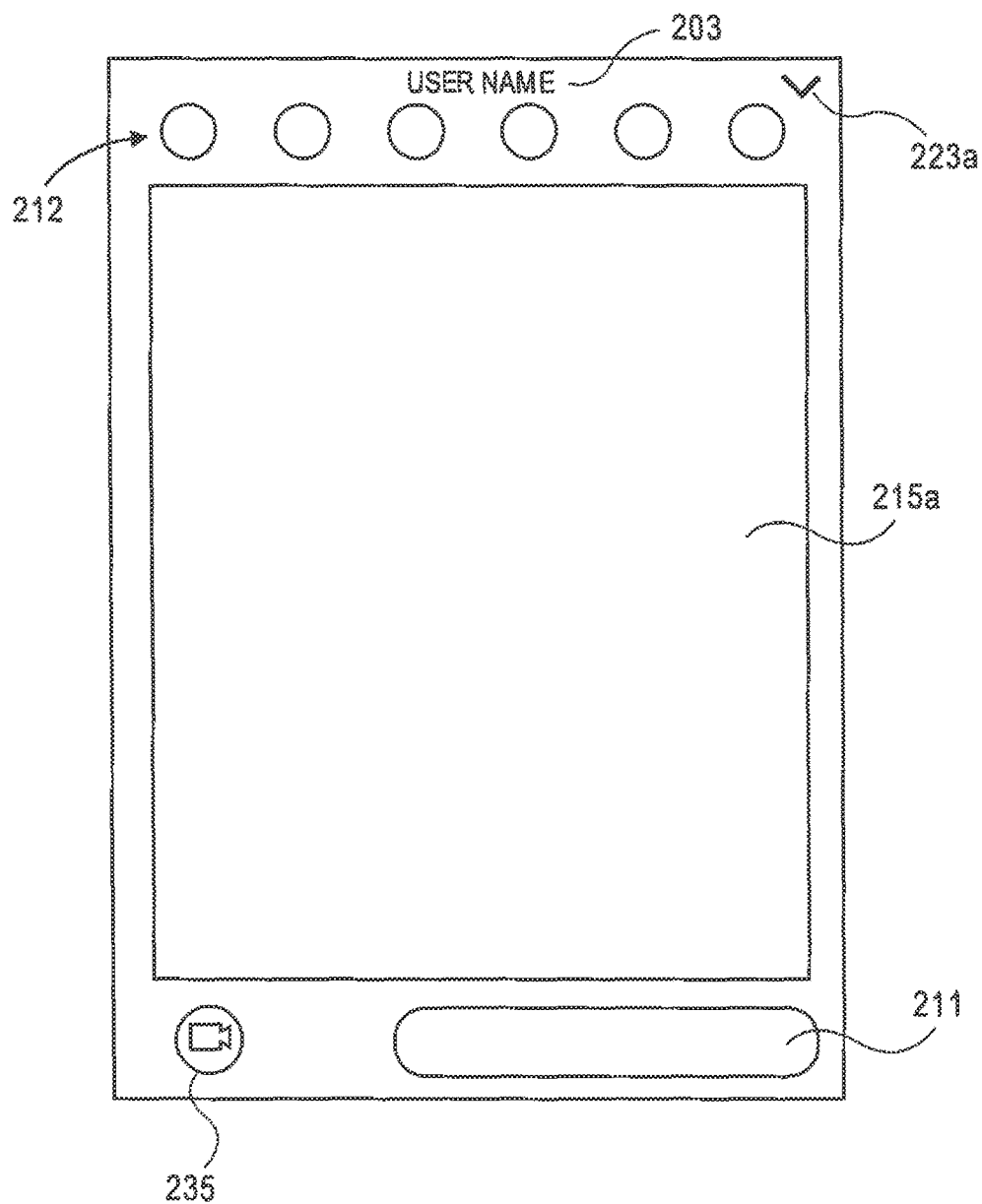
FIG. 7B shows an example of a user interface of an extension app in an expanded view according to one embodiment.

FIGS. 7A and 7B illustrate another aspect of the embodiments described herein in which the extension app can cause a view to be changed by sending communications to the messaging app to cause that change. In one embodiment, an application programming interface (API) can be provided between the extension app and the messaging app to allow the extension app to make calls to that API to change its view within the messaging app which hosts the view of the extension app. In one embodiment, an extension app can have at least two different views which can include a compact view and an expanded view. In one embodiment, the compact view may be a view which takes the place of the on-screen keyboard of the messaging app while the message transcript remains displayed in the user interface of the messaging app. In the expanded view, the message transcript is no longer displayed and the on-screen keyboard is not displayed but certain other components of the user interface of the messaging app, such as text entry region 211 and a camera activation icon 235 are displayed. FIG. 7B shows an example of an expanded view in which the drawing canvas 215A occupies most of the space of the touch screen. As shown in FIG. 7B, the compact view icon 223A can be selected by the user to cause the system to change from the expanded view shown in FIG. 7B back to the compact view, such as the view shown in FIG. 5A.

The method shown in FIG. 7A is one embodiment showing how the view can change, and it will be appreciated that in alternative embodiments, the sequence of operations may be performed in a different order and there may be omitted steps or intervening steps or additional steps.

In operation 351 of FIG. 7A, the extension app is displayed by the messaging app with a particular view or style. In operation 353, the extension app can make a call to the messaging app to get the current presentation view/style of the extension app. In operation 357, the messaging app can provide a return for the call from operation 353, and that return can indicate the current presentation view/style of the extension app. In response to that current presentation received in operation 357, the extension app can request a change in the presentation view/style by providing a call to the messaging app to cause that change to occur, and that call is received in operation 361. The messaging app in one embodiment can initially respond to this call with an acknowledgement that the view is being changed or will be changed. In response to the call, in operation 363, the messaging app changes the presentation style/view and displays the extension app within the requested view presentation view/style and in operation 365 the messaging app informs the extension app that the change of view has been completed. Referring back to FIG. 7B, if the user selects the compact view icon 223A, this can cause a call from the extension app to the messaging app to change the view of the extension app within the user interface of the messaging app.

Figure 8:
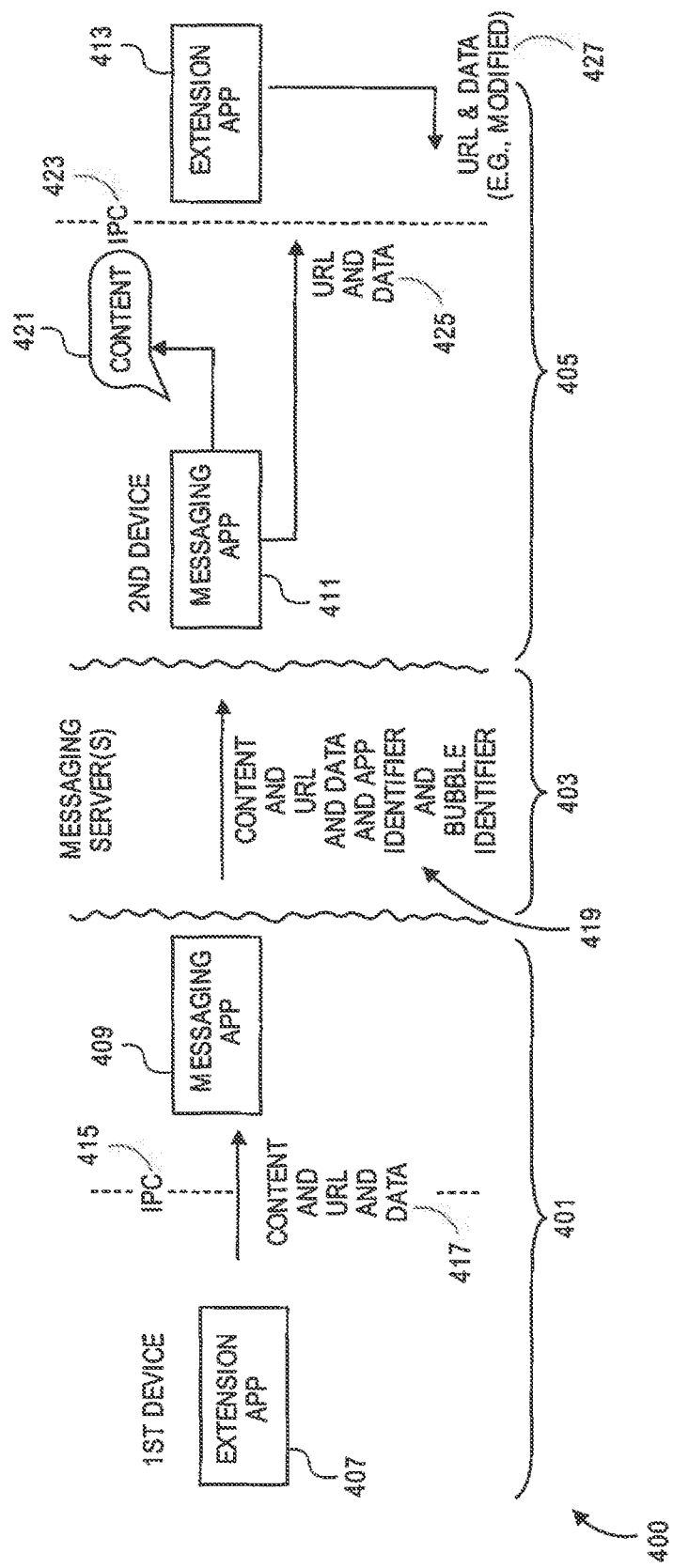
FIG. 8 shows an example according to one embodiment in which extension apps on two or more devices can interact with each other through the messaging apps on each device.
Figure 9A:
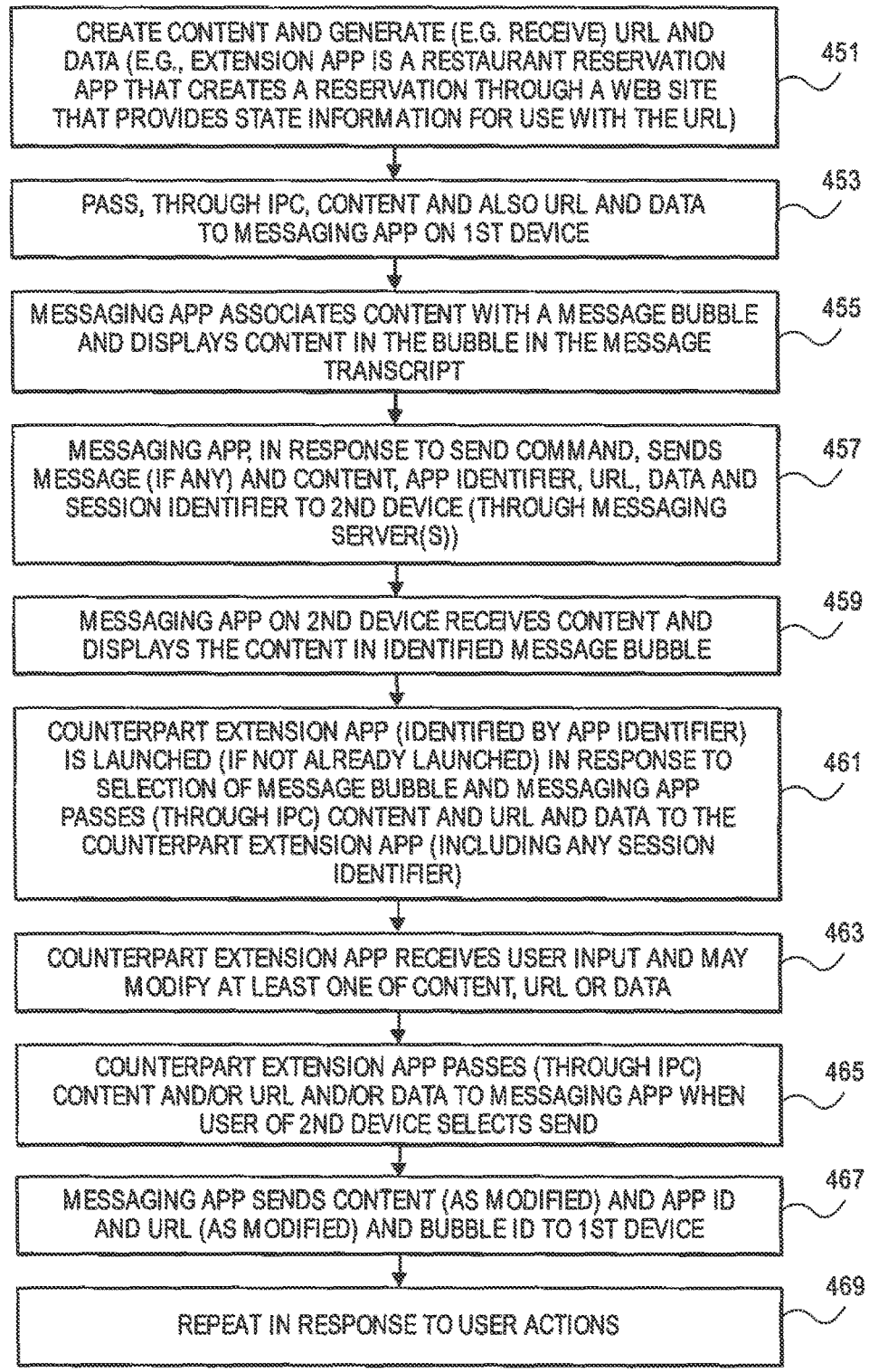
FIG. 9A is a flowchart which illustrates a method according to one or more embodiments described herein for allowing the interaction between extension apps on different devices.
Figure 9B:
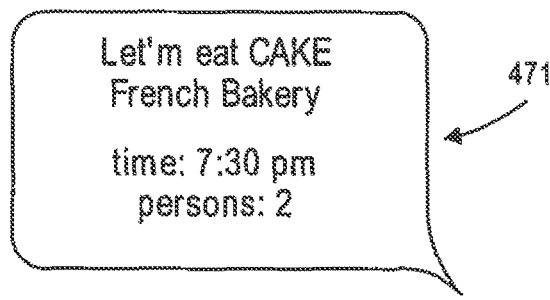
FIG. 9B shows an example of a message bubble in a user interface which can result from the method shown in FIG. 9A when two or more extension apps interact in a session.
Figure 9C:
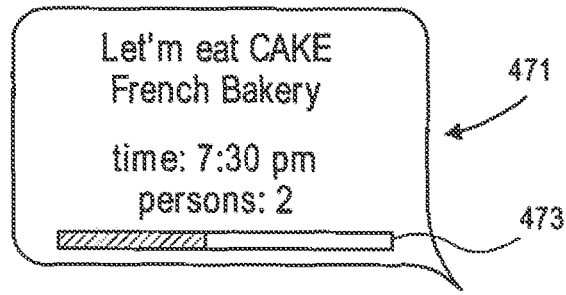
FIG. 9C shows an example of a message bubble according to one embodiment in which a download and install for a required extension app occurs while the messaging app remains in the foreground.

FIGS. 8, 9A, 9B, and 9C will now be described relative to another aspect of the embodiments presented herein. In one aspect of this embodiment, an extension app and a counterpart extension app on another device can engage in a communication session and exchange information back and forth in their communication session, and all of this occurs within the context of a message transcript maintained by the two messaging apps which interface between the two extension apps as shown in FIG. 8. In one embodiment, plug-ins for a messaging app can also operate in a similar way and exchange information between the plug-ins through two messaging apps that are in a session. The messaging system 400 shown in FIG. 8 includes at least two clients devices, client device 401 and client device 405 and also includes a set of one or more messaging servers 403. The client devices 401 and 405 can be similar to the client devices 53 and 54 in FIG. 2, and the set of one or more messaging servers 403 can be similar to the set of messaging servers 51 shown in FIG. 2. Each client device can include an installed copy of a particular extension app (such as, for example, an extension app for making reservations at restaurants), and the extension app on each device can be used to create content (e.g. text, images, audio, video, etc.), and this content is passed, through an interprocess communication framework to the messaging app on the device for a specific message, which can be referred to as a message bubble, in the message transcript on the particular client device. The message app receives the content (and optionally other data from the extension app, including for example an identifier of the extension app, a resource locator and optionally metadata for use by a counterpart or remote extension app on the other device, etc.) and displays the displayable content (such as an image of a restaurant provided by the extension app which is a restaurant reservation app such as "Open Table" in the message bubble in the message transcript). In effect, the messaging app hosts a view within the messaging app and the content of that view is provided by the extension app. The resource locator and metadata in one embodiment are opaque to the messaging app (e.g. cannot be recognized by the messaging app) but can be used by the extension apps on each device to maintain state information for the session between the extension apps, and the messaging apps on each device act as a communication mechanism between the extension apps by passing the resource locator and metadata between the extension apps. In one embodiment, state information about the session may be encoded in the resource locator or may be provided in the metadata or may in both. In one embodiment, the content created from a session on each device is displayed within the same single message bubble (identified by a session identifier that can be maintained by the messaging app) in the message transcripts, and each time the content changes (based on changes from either device), the updated content continues to be displayed within a single message bubble in the message transcript and any prior message bubbles that displayed content in the session can be converted into breadcrumbs, and these prior message bubbles will also include the same session identifier as the new, updated message bubble. The operations and functions of the components shown in FIG. 8 will now be described while referring to FIG. 9A which shows a method of operating the messaging system 400 in one embodiment.

In operation 451 of FIG. 9A an extension app, such as the extension app 407 can create content and generate a resource locator and data (or can modify existing content, resource locator or data). The extension app can be similar to the extension app 83 and is executing in one embodiment in one process while the messaging app, which can be similar to the messaging app 76, is executing in another process and communication between the processes occurs through an IPC, such as the IPC 81 which can be a software framework or library for providing interprocess communication between two distinct processes. The extension app 407 can be, for example, a restaurant reservation app that creates a reservation through a website that can provide a state information for use with the resource locator (or the state information can be encoded into the resource locator). In one embodiment, the data provided with the resource locator can be a state information provided from the website, and the state information can include information about the particular restaurant and the time of the reservation and the number of people in the reservation. The extension app 407 can present, in either a compact view or expanded view the user interface for making the restaurant reservation through the website while the remainder of the messaging app is displayed, including for example the message transcript. Thus the user of the extension app 407 can see the context of the conversation in the message transcript while interacting with the extension app and the website (through the extension app) to create a restaurant reservation. In one embodiment, the user may be able to browse through various restaurants (within the restaurant reservation app) and search for restaurants. After the user of the extension app 407 has selected a restaurant and entered a reservation, the extension app 407 can pass, through the IPC 415, content and also the resource locator and data 417 shown in FIG. 8 for the messaging app on device 401. This is shown as operation 453 in FIG. 9A. In operation 455, the messaging app 409 associates the content received from the extension app 407 with the message bubble and displays content in the bubble in the message transcript in the user interface of the messaging app 409. Then in operation 457, the messaging app 409, in response to a send command received from the user, sends a message (if any) and content received from the extension app 407, and an app identifier which identifies the app 407 (and optionally an icon of the app 407), and the resource locator and the data (if any) and a session identifier to the second device through the one or more messaging servers 403 which pass the communication 419 to the second device 405 (also referred to as client device 405). In one embodiment, the operations 453 and 455 can occur as part of operation 457 in response to the messaging app receiving the selection of the send command. The icon of the app 407 can be displayed on the message bubble on the receiving device even if the counterpart extension app is not installed; see for example, icon 87 in FIG. 3B. In operation 459 shown in FIG. 9A, the messaging app 411 on the client device 405 receives the content from the one or more messaging servers 403 and displays the content in the identified message bubble 421 within the message transcript provided by the user interface of the messaging app 411. FIG. 9B shows a more detailed example of such a message bubble 471 having content created by a restaurant reservation extension app in one embodiment. In the example shown in FIG. 9B, the content includes the name of the restaurant, the time of the reservation and the number of persons of the reservation. In one embodiment, this content can be displayed by the messaging app without requiring that the extension app 413 be launched. In one embodiment, the extension app 413 is not launched until the user of client device 405 selects the message bubble 421, thereby indicating to the client device that the user of the client device 405 intends to interact with the content in the message bubble 421. In an alternative embodiment, the extension app 413 can be launched upon receipt by the messaging app 411 of the content but remain in the background and be ready for execution when the user of client device 405 enters a command to cause the extension app to appear. In operation 461, the extension app 413, which is identified by the app identifier provided in the communication 419 is launched, if not already launched, in response to selection of message bubble 421 and the messaging app 411 passes, through IPC 423 the content associated with message bubble 421 and resource locator and data 425 to the messaging app 413. In one embodiment, the extension app 413 is the counterpart extension app that is the same extension app as extension app 407, while in another embodiment they can be merely compatible in that they can process the same type of content.

At this point, the extension app 413 can receive user input by the user of client device 405 and can modify one or more of the content, the resource locator or the data. For example, the user of client device 405 can cause the extension app 413 to access one or more websites to make a modified restaurant reservation by modifying the time, the number of people, the particular restaurant, etc. In one embodiment, the extension app 413, and also the extension app 407 can interact directly (but separately and independently) with the web server by sending the resource locator and the data to the web server and receiving responses from the web server which may include modified data or modified resource locators, or new data and/or new resource locators etc. In one embodiment, the web server can store data for use during the session, and this stored data can include information for some or all of the state information that can also be maintained by the two extension apps in the session. Again, if the extension app 413 is presented for display in a compact view, then the user of the device 405 can interact with the extension app 413 to make the restaurant reservation while the context and conversation of the chat or messaging session is shown in the message transcript of the messaging app 411. The user of the client device 405 can scroll through the message transcript while continuing to look at and interact with the extension app 413. Thus, the extension app 413 can, in operation 463 receive user input and may modify at least one of the content, the resource locator or data, and then can pass, in operation 465 the resource locator and data 427 (which may be modified or new) to the messaging app 411. In turn, the messaging app 411 in operation 467 can send the content, which may be modified, and the app identifier and the resource locator (which may be modified) and data (which may be modified) and the bubble ID back to the client device 401. As shown in operation 469, this process can repeat over time as the two users work on setting up a restaurant reservation in the example provided herein.

It will be appreciated that many different types of extension apps can provide a collaborative environment between the users of client devices 401 and 405 to exchange information and collaborate together and that restaurant reservation is one such type. Thus, it will be appreciated that the restaurant reservation example that is described relative to FIGS. 8 and 9A is merely an example of one such type of extension app which can provide a collaborative environment in the context of the user interface of a messaging app. Examples of other types of extension apps which can provide a similar collaborative environment include, for example: sticker extension apps; imaging apps; drawing apps; content creation apps; games; music creation apps; content consumption apps; polling apps; map apps; etc.

The collaborative environment shown in FIG. 8 and described relative to FIG. 9A can utilize breadcrumbs in one or more embodiments, and each of the breadcrumbs can be identified by a session identifier. A breadcrumb represents a converted message bubble and is identified by a session identifier that is shared with other message bubbles in the session. Each prior message bubble that is identified with the same session identifier as a new message bubble can be converted in one embodiment into a breadcrumb which can appear differently than the original content shown in the message transcript. As each new message bubble in the session arrives or is added to the message transcript, the prior message bubble identified with the same session identifier can be converted into a breadcrumb in one embodiment, and this is shown in the message transcripts shown in FIGS. 9D, 9E, 9F, 9G, and 9H. FIGS. 9D and 9H show a message transcript 510 on Joe's device, and FIGS. 9E, 9F, and 9G show a message transcript 17 on Lester's device. Message transcript 510 shows Lester's user name 511, and message transcript 517 shows Joe's user name 518. In the example shown in FIGS. 9D, 9E, 9F, 9G, and 9H, Lester and Joe are engaged in a text messaging conversation and are each using an extension app, such as an image creation app or other extension apps. For example, Lester can be using extension app 407 shown in FIG. 8 and Joe can be using extension app 413 shown in FIG. 8. Lester's device can be using messaging app 409 while Joe's device can be using messaging app 411. Referring back to FIG. 9D, it can be seen that the message transcript 510 includes message bubble 512 and message bubble 513 which indicate the content of the conversation within the message transcript 510. In addition, Joe has used the extension app 413 to create content 515 which is appended to message bubble 514. For example, Joe may have entered text as a text message and also created content using the extension app 413 and then cause both the text shown within message bubble 514 and the content 515 to be sent to Lester's device. The right side of the message transcript 510 shows messages that were sent by Joe while the left side of the message transcript 510 shows messages that were received from Lester. Referring now to FIG. 9E, it can be seen that message bubble 513 is now on the right side of the message transcript 517 while message bubble 514 and content 515 are on the left side of the message transcript 517 on Lester's device. Hence, Lester's device has received the text message within message bubble 514 and has also received the content generated by the extension app on Joe's device. Lester can then tap on the content 515 to cause the launching of the corresponding or counterpart extension app on Lester's device. The content 515 is associated with a session identifier which is maintained for the extension app on Lester's device. For example, at this point in the process, operation 461 shown in FIG. 9A can be performed on Lester's device as a result of the user selecting the content 515 which can be displayed within a message bubble in one embodiment. Lester can then use the extension app on Lester's device to create modified content or new content and send that modified or new content back to Joe. In FIG. 9F, it can be seen that Lester has created modified or new content 521 which is shown within a staging area 519 which shows text and other content that is ready to be sent and will be sent in response to selection by a user of a send command, such as the send button 523 shown in FIG. 9F. When Lester selects the send command with the content shown in the staging area 519, this causes the text message 520 and the new or modified content 521 to be sent to Joe, and this can be seen in FIG. 9G in which message bubble 521A shows the text message 520 on the right side of the message transcript 517 which also shows the content 521 which was modified or created as new by Lester using the extension app 407 on Lester's device.

It can be seen from FIG. 9G that content 515 has now been converted into a breadcrumb 515A. This conversion in one embodiment can be performed by the messaging app or alternatively by the extension app. In one embodiment, the extension app can provide the text which appears within the breadcrumb 515A, and the messaging app will use the session identifier to identify the message bubble that will be converted into a breadcrumb and this will cause the conversion of content 515 into the breadcrumb 515A and display the breadcrumb next to the associated message bubble 514 without converting that message bubble 514 into a breadcrumb in one embodiment. Thus, FIG. 9G shows how a session identifier associated with prior message bubbles or content created by an extension app can be used to convert the prior message bubble(s) into a breadcrumb on a sending device. FIG. 9H shows how the conversion is displayed in one embodiment on the receiving device. In the figure shown in FIG. 9H, the message bubble 520A is shown on the left side of the message transcript 510 along with the new or modified content from extension app 403 from Lester's device. The content 515 on Joe's device has been converted into a breadcrumb 515A on the right side of the message transcript and is displayed adjacent to the message bubble 514 which accompanied the content 515 when the content 515 was originally sent.

If the receiving device, such as client device 405 in operation 459 is capable of installing and using the extension app (identified by the app identifier provided in communication 419) but that the extension app is not installed on the receiving device, the receiving device can, within the user interface of the messaging app offer to download and install the extension app (again specified by the app identifier in communication 419, on the receiving device). FIG. 9C shows an example in which the content from extension 407 can be displayed on the client device 405 in a message bubble 471 and the client device 405 is in the process of downloading and installing the extension app identified by the app identifier in communication 419. In the example shown in FIG. 9C, the content is displayed within the message bubble 471 while the extension app 413 is being installed. In one embodiment, a progress bar 473 (or alternatively a progress circle) can be shown within the message bubble 471 during the installation process. In one embodiment, the downloading and installation process can be performed in the background while the messaging app remains the foreground application. If the receiving device is not capable of installing or using the extension app, then the resource locator and the metadata can be passed in one embodiment to a web browser on the receiving device, and the web browser can become the foreground app and allow for the user interaction with the web page referred to by the resource locator.

Figure 10:
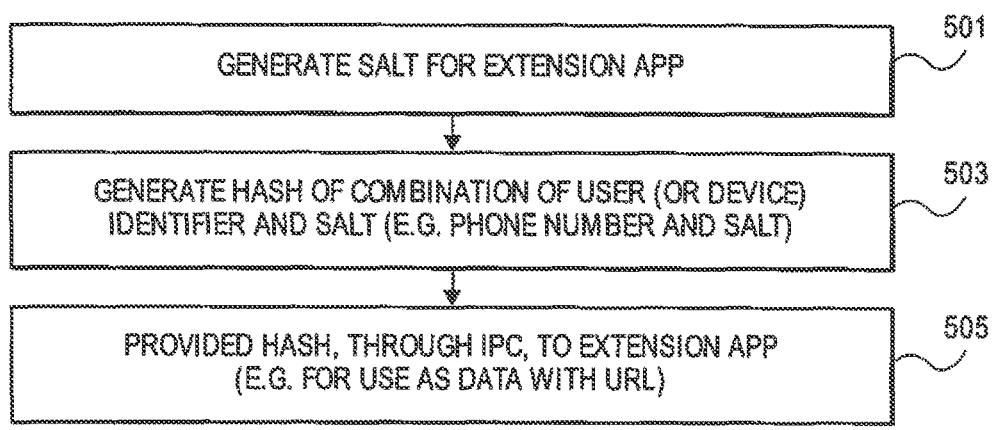
FIG. 10 is a flowchart which illustrates a method according to one embodiment described herein.

In some embodiments, it may be desirable to provide an identifier of each user to each extension app executing on a client device, particularly in the case of a collaborative environment in which two or more users are interacting through the messaging apps and the extension apps. FIG. 10 shows an example of a method to provide an identifier for each extension app without causing a loss of the user's privacy. The method shown in FIG. 10 can be performed by each messaging app on each client device. In one embodiment, the method can be performed in response to a call from an extension app to an application programming interface (API) which can allow the extension app to request an identifier of the local user. In one embodiment, the identifier can be the local user's email address or phone number or other identifier used by the messaging system. The identifier provided to the extension app is an obfuscated identifier created, in one embodiment, by the method shown in FIG. 10. In operation 501, the messaging app can generate, in response to a call from the extension app, a salt for the particular extension app. In one embodiment, the salt can be a random number which is associated with that particular extension app. Then in operation 503, the messaging app can generate a hash (such as a SHA-1 hash) of a combination of a user or device identifier and the salt. For example, the user identifier may be the phone number or email address of the user and that phone number or email address is combined with the salt and then the hash is created for that combination in operation 503. Then in operation 505, the hash is provided, through the IPC, to the extension app, and that hash value can be used as data with the resource locator which can then be sent to the other extension app to identify the user that has made changes or has created a content. In another embodiment, the messaging app can obfuscate the identifier by maintaining a mapping of the identifier and a randomly generated unique identifier for each extension app. In other words, for a given extension app, the messaging app can generate a random (and unique) identifier for the extension app and associate (e.g., map) that random identifier with the identifier of the user (e.g. local user's email address or phone number or other identifier used by the messaging system). This random identifier for the given extension app can be provided to the extension app, but the identifier is not provided to the extension app. Another extension app would receive a different, randomly generated identifier. This extension app specific identifier can then be provided to a counterpart extension app on another device so that the two extension apps can keep track of which users performed which actions in the context of a session or other collaborative environment.

Figure 11:
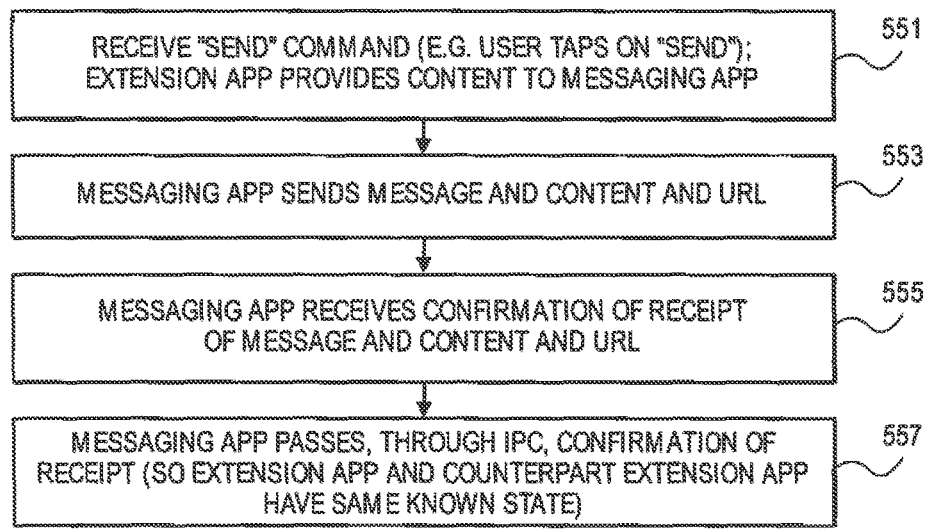
FIG. 11 is a flowchart which illustrates a method according to one embodiment described herein.

In one embodiment, the messaging systems described herein can provide confirmation of receipt of messages to one or more extension apps, and this may be useful in certain cases in which the extension app needs to be assured that the remote extension app has the same known state as the local extension app. FIG. 11 shows an example of a method for providing confirmation of receipt. In operation 551, the messaging app receives the "send" command from a user and in response the local extension app provides the content to the messaging app. In turn, in operation 553, the messaging app sends the message and message bubble identifier and content and resource locator (if any) through the one or more messaging servers to a receiving device which also includes a message app. At some point, the messaging app on the local device in operation 555 receives a confirmation of receipt of the message and content and optional resource locator, and then can pass, in operation 557, through the IPC the confirmation of receipt to the local extension app so that the local extension app knows that the remote extension app has the same known state when the extension app provided its content for transmission to the remote extension app.

Figure 12:
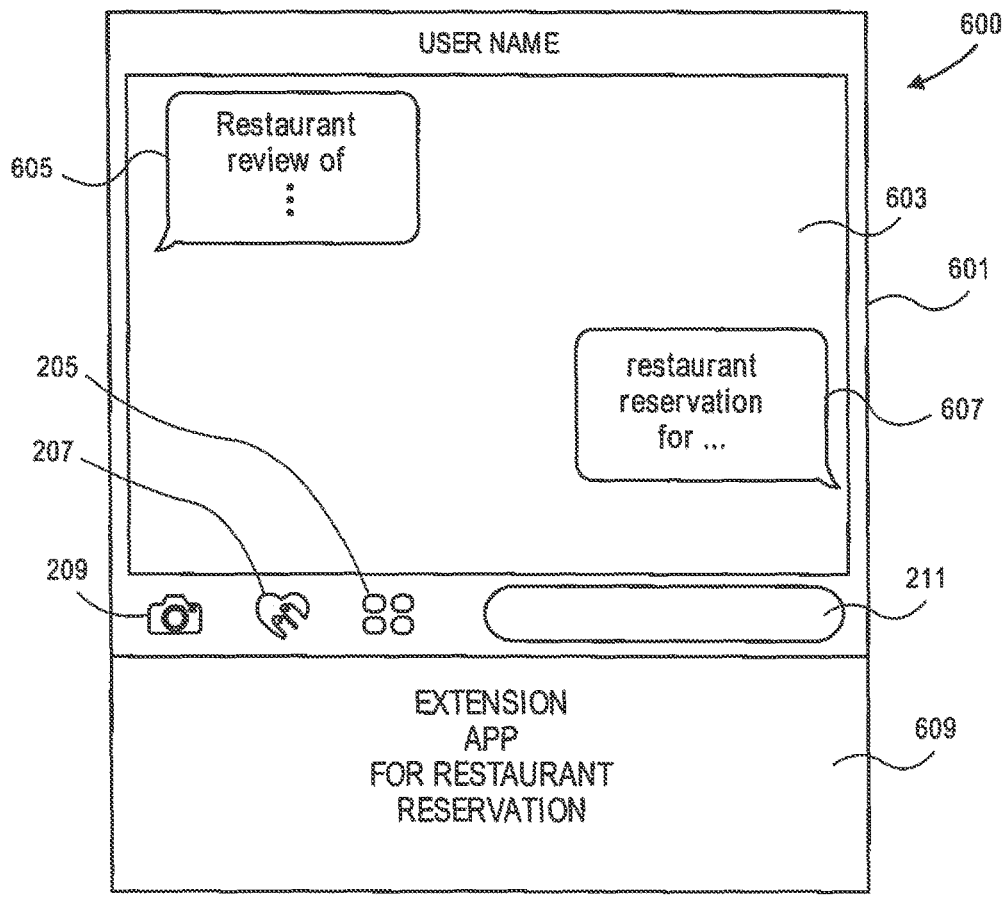
FIG. 12 shows a user interface of a messaging app in which content from two or more different extension apps is presented within the same message transcript provided by the messaging app.

FIG. 12 shows another aspect to the embodiments described herein, and that aspect relates to the presentation of multiple message bubbles within a message transcript where different message bubbles have content created by different extension apps, and at least one of which may be executing (and have its content displayed in a compact view) while the message transcript of the user interface of the messaging app is also displayed. FIG. 12 shows an example of such an aspect. The communication device 600 in this embodiment includes a touch screen 601 which displays a message transcript 603 which includes two message bubbles 605 and 607. In addition, the messaging app presents a compact view 609 of an extension app, which in this case is an extension app for a restaurant reservation. In the example shown in FIG. 12, the extension app for a restaurant reservation has been used to send a message showing the content of a restaurant reservation, which is depicted as message bubble 607. This may have occurred as a result of receiving a message from another user who uses another communication device which provides the content of a restaurant review from another extension app. In the example shown in FIG. 12, message bubble 605 shows the content created by a remote extension app for providing restaurant reviews which is different than the extension app for making a restaurant reservation. In one embodiment, both extension apps may be executing on both communication devices that are part of the messaging session or chat.

Figure 13A:
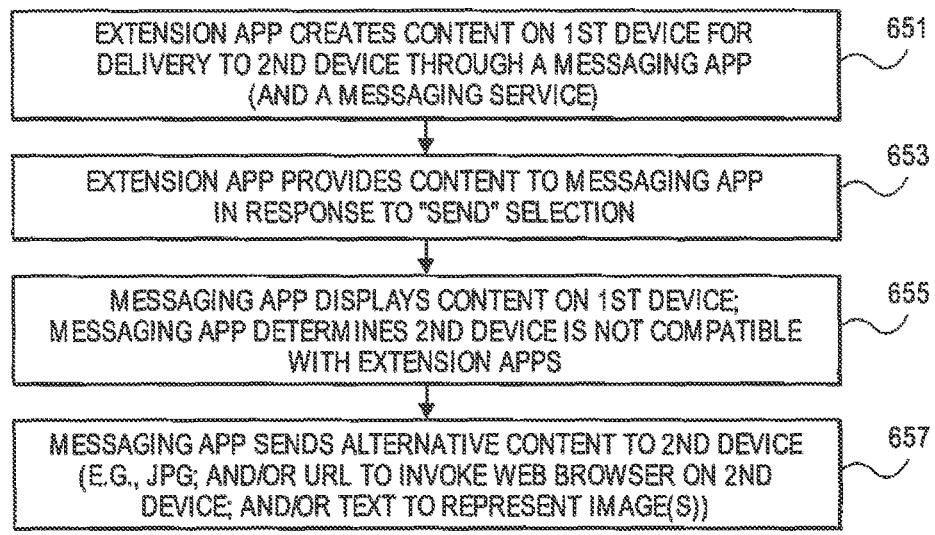
FIG. 13A is a flowchart which shows a method according to one embodiment for providing backward compatibility for older devices or older messaging systems.
Figure 13B:
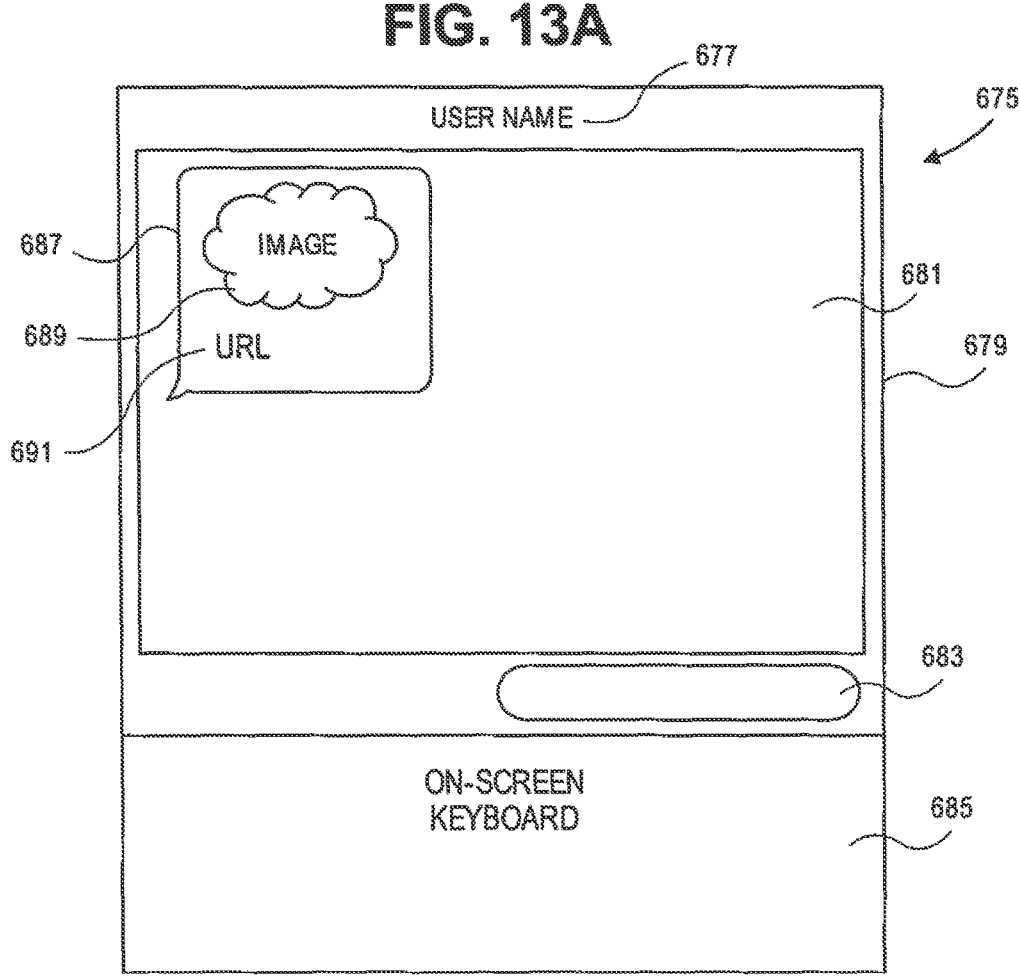
FIG. 13B shows an example of a user interface in which backward compatibility has been provided within a messaging app.

Another aspect of the embodiments described herein relate to backward compatibility, and that aspect is shown in FIGS. 13A and 13B. Certain older devices may not be compatible with the extension app architecture described herein or may not use this architecture or may not even be smartphones. In one embodiment, a client device which is sending the message may be able to provide alternative content, either automatically or based upon a determination that the receiving device is not compatible with extension app. A method for providing backward compatibility is shown in FIG. 13A. In operation 651, an extension app on a sending device creates content on the sending device (first device) for delivery to a second device through a messaging app and a messaging service. This can be similar to operation 451 in FIG. 9A. The content created in operation 651 can then be passed through an interprocess communication to the messaging app in operation 653 in response to the messaging app receiving the user's "send" selection. Then in operation 655, the messaging app can display the content on the first device and also determine that the second device is not compatible with extension apps. In one embodiment, this can be determined as a result of receiving information about the receiving device (second device) from one or more messaging servers, such as the one or more messaging servers 51 shown in FIG. 2 which can maintain information about the state of each device, such as the version of the operating system of the device or the type of device, etc. As a result of determining that the second device is not compatible with extension apps, the messaging app can in operation 657 send alternative content to the second device, and FIG. 13B provides an example of this alternative content.

The communication device 675 shown in FIG. 13B may be, for example, an older smartphone which uses an older operating system that is not compatible with extension apps described herein. Nevertheless, the communication device 675 includes a touch screen 679 and a text entry region 683 and an on-screen keyboard 685 that provide functionality of a messaging app which also displays a message transcript 681 which includes a message bubble 687. The message bubble 687 contains the alternative content provided by a sending message app on a remote device. In this case the content includes an image 689 and a resource locator 691 which may be user selectable to cause the display of a web page which the resource locator 691 refers to. In other words, the resource locator 691 may be user selectable to invoke a web browser on the communication device 675 to allow the user of the communication device 675 to interact through a web browser with the web page which may have the same affect in certain instances as an extension app interacting with the website.

Another aspect of the embodiments described herein relate to a service, such as an app marketplace that can provide a plurality of different extension apps for use within a messaging app according to the one or more embodiments described herein. The service or app marketplace can present browsable views of the plurality of different extension apps and messaging app plug-ins and provide information about those various extension apps and provide for downloading of those extension apps to a client device to allow the client device to install one or more extension apps. FIG. 14A shows an example of a method for using such a service or app marketplace and FIG. 14B shows an example of a user interface for a messaging extension app marketplace. The app marketplace shown in FIG. 14B may be invoked in one embodiment from a browsable view of installed extension apps within the user interface of the messaging app on a client device. For example, the selection of icon 167 shown in FIG. 4B may cause the presentation of the messaging extension app marketplace shown in FIG. 14B. The user can then browse through the one or more collections of messaging extension apps and select one or more extension apps which may be free or may be purchased. In the example shown in FIG. 14B, the messaging extension app marketplace 725 can include a navigation bar 729 and a browsable view of one or more messaging extension apps, such as apps 726, 728, and 731 displayed on the touch screen 727. The user can browse through the apps by swiping, in one embodiment, the user's finger across the touch screen or by the use of a navigation bar 729. The user can then select the download and install one or more of the extension apps, and as a result the messaging app on the user's client device can add an icon representing the newly installed extension app into the browsable view of installed extension apps, such as the browsable view 157 shown in FIG. 4B. In addition, the messaging app can add the installed extension app into a list of installed extension apps along with the identifier of the app ("app identifier") provided by the app marketplace. While the user's use of the app marketplace shown in FIG. 14B is one way of installing extension apps, another way is shown in FIG. 14A in which the installation process begins as a result of the user interacting with a message in the message transcript of a messaging app.

Referring now to FIG. 14A, a messaging app in operation 701 can receive content (and an optional resource locator and data) created by an extension app on a remote device, such as a first device, and can also receive an app identifier of the extension app on the remote device. In one embodiment, the app identifier can be the same identifier provided by the app marketplace when the extension app was installed on the first device or can be a different identifier that is associated with the app store's identifier. Then in operation 703, the messaging app on the second device can display the content in a message bubble and can retain the resource locator and data if provided. At this point, the messaging app in this embodiment does not attempt to launch an extension app which in fact is not installed on the second device at this point in time. Then in operation 705, the messaging app receives a selection, such as a tap, of the message bubble containing the content provided by the extension app from the first device, and the messaging app determines that the extension app (as identified by the received app identifier) is not installed on the second device. At this point, as shown in operation 707 of FIG. 14A, the messaging app offers to download and install the extension app on the second device and the user can select to install that extension app which was identified by the app identifier received in operation 701. In some instances, the user may need to purchase the extension app before it can be downloaded and installed. The offer to download and install may be presented in a notice, such as the notice 259 shown in FIG. 5F, and this notice may include a selectable option to cause the downloading and the installing of the extension app for the selected message bubble. Then in operation 709, the second device downloads and installs the extension app and can launch the newly installed extension app. In one embodiment, the download and install can occur in the background while the messaging app remains the foreground. In one embodiment, the progress of the download and install can be shown in a progress bar, such as the progress bar 473 shown within the selected message bubble. After operation 709 is completed, then the newly installed extension app can be used on the second device and, the messaging app can provide, in operation 711, the content and optional resource locator and data to the extension app on the second device within the view hosted by messaging app.

In one embodiment, the messaging app may cause the automatic updating of extension apps which have been installed. In another embodiment, the messaging app may provide alerts or notices to the user that certain extension apps are in need of being updated and the notifications about these updates can be received from an extension app marketplace in one embodiment. This can allow a user to selectively decide whether or not to update specific messaging apps.

FIGS. 15, 16, 17, 18A, 18B, 19A, and 19B, show an example of one or more embodiments according to another aspect of a messaging system. The system 1000 shown in FIG. 15 includes the plurality of data processing systems which interact together to allow the use of stickers that have different resolutions for different screen resolutions of client devices that are used in the system. One or more data processing systems used by one or more sticker developers can be used to upload stickers to a store from which the stickers can be purchased and downloaded or downloaded without purchase. One or more stickers controlled by one or more sticker developers 1001, such as one or more graphic artists can upload 1002 stickers to one or more servers 1003 which can implement a sticker and/or app store and services associated with that store. These one or more servers 1003 for the store and services can receive the uploaded stickers and process the stickers to create a sticker database which can be one or more sticker databases 1005. The set of one or more servers 1003 can create a plurality of bundles, one for each screen resolution of targeted devices which can receive and use the stickers. The one or more servers 1003 can create separate bundles for the stickers, where each bundle includes a set of stickers, one for each image in the sticker bundle at a particular resolution designed to be used with the particular screen resolution of a set of devices having that screen resolution. Moreover, each bundle can include one or more metadata files which specify identifiers for each sticker within the bundle and one or more authorization tokens described herein. These bundles and the associated information, such as the one or more metadata files can be stored by the set of one or more servers 1003 in a set of one or more databases 1005, which will be described further below in conjunction with FIG. 16. The one or more sticker databases 1005 can be operatively coupled to the one or more servers 1003 and a set of optional distribution servers 1021 which can be used to distribute stickers to receiving devices, such as receiving devices which have not purchased an entire bundle of stickers.

Figure 15:
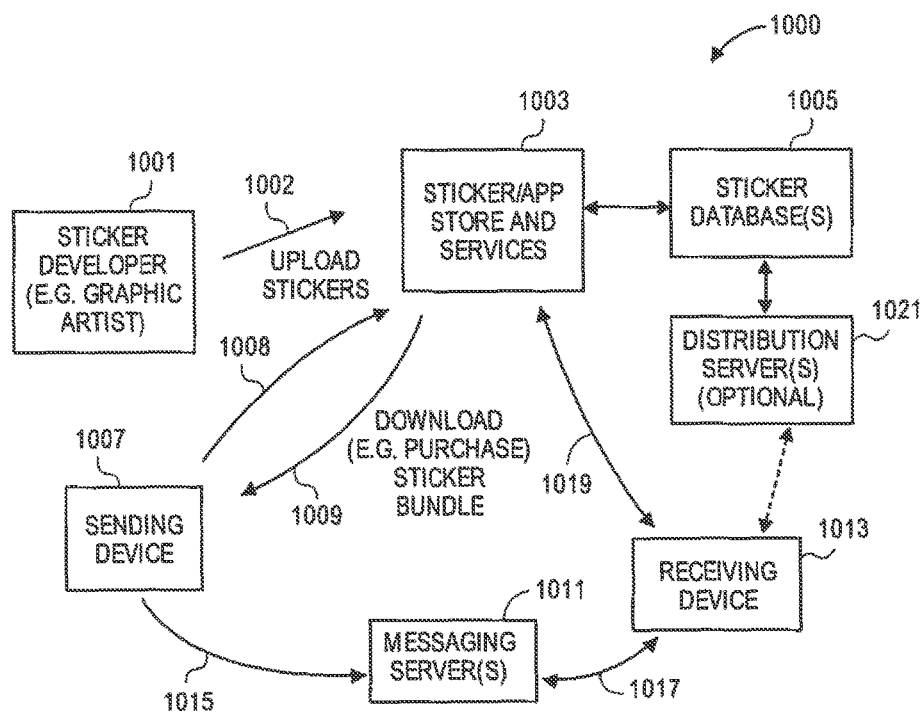
FIG. 15 shows an example of a system for using sticker images obtained from one or more sticker developers, such as graphic artists.

The system shown in FIG. 15 also includes one or more sending devices, such as sending device 1007, and one or more receiving devices, such as receiving device 1013 which can communicate messages, such as text messages between those devices through one or more messaging servers 1011. In one embodiment, the sending device 1007 can request a bundle of stickers and receive that bundle from the set of one or more servers 1003 which can implement the store for stickers and/or apps. In particular, the sending device 1007 can request 1008 a bundle of stickers and receive those stickers in a download 1009, which can allow the sending device 1007 to send text messages or other messages which include one or more stickers obtained from the sticker bundle. For example, the sending device 1007 can send 1015 a sticker identifier and a bubble identifier and optional text and an optional authorization token in send operation 1015 through one or more messaging servers 1011 which in turn can forward that information to one or more receiving devices, such as receiving device 1013. The receiving device 1013 can then process the sticker identifier and other information as described herein to present a message which can include a sticker which is identified by the receiving device 1007 according to one embodiment.

The send operation 1015 can include in one embodiment an identifier of a sticker which can be, in one embodiment, independent of resolution of the sticker and can also include a bubble identifier and any optional text associated with a text message or other message to which the sticker will be applied. In addition, an authorization token can be included in send operation 1015. The messaging servers, such as one or more messaging servers 1011 can forward in operation 1017 this information, including the sticker identifier, the bubble identifier, any optional text, and the authorization token to the receiving device 1013. In turn, the receiving device 1013 can utilize the sticker identifier to retrieve the sticker or to purchase the bundle containing the sticker from the set of one or more servers 1003 or the distribution servers 1021.

Figure 16:
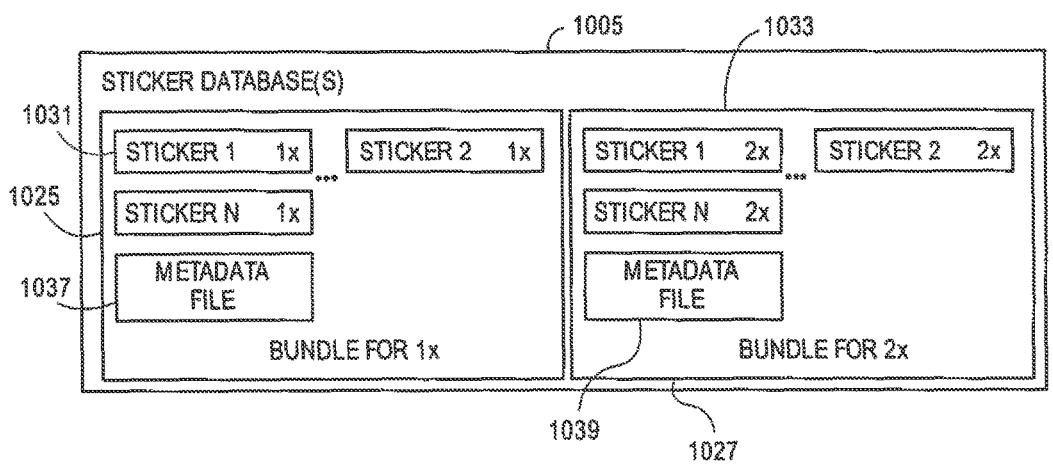
FIG. 16 shows an example of a sticker database according to one embodiment described herein.

FIG. 16 shows an example of one or more sticker databases 1005 which are created in response to the upload of stickers from sticker developers, such as sticker developers 1001 which upload their stickers in operation 1002 shown in FIG. 15. The one or more sticker databases 1005 can include, in one embodiment, different distinct bundles for each distinct target screen resolution of target devices. For example, bundle 1025 includes a set of sticker images for a particular screen resolution of target devices having that screen resolution while bundle 1027 includes the same set of images of the same set of stickers for target devices having a different screen resolution, such as a 2X screen resolution. For example, the same sticker image "sticker 1" is contained within the two bundles 1025 and 1027. As shown in FIG. 16, the sticker image for sticker 1 1031 is contained within bundle 1025 while the same image of a different resolution for sticker 1 1033 is contained within bundle 1027. FIG. 16 shows an embodiment in which each bundle contains only sticker images of a particular screen resolution for particular target devices such as a set of target devices that share the same or similar (close enough) screen resolutions to the target device. In one embodiment, each of these bundles, such as bundle 1025 and 1027 include one or more metadata files, such as metadata file 1037 for bundle 1025 and metadata file 1039 for bundle 1027. These metadata bundles can include a variety of information, such as a unique (e.g., universally unique) identifier for each sticker in the bundle as well as one or more authorization tokens to allow a receiving device to download at least one sticker from the bundle even though the receiving device has not purchased a bundle from the app or sticker store. FIG. 16 shows an embodiment in which the bundle 1025 includes a metadata file 1037, and the bundle 1027 includes a metadata file 1039. The metadata file 1037 can include a sticker identifier for each sticker, such as sticker 1031 contained within the bundle 1025, and the metadata file 1037 can also include one or more authorization tokens which can be sent to a receiving device to allow the receiving device to retrieve a particular sticker in the bundle without having to purchase the entire bundle in one embodiment. Each of the stickers in one embodiment can be for a particular image at a particular resolution and the bundle can contain only images of that resolution and no other resolution in one embodiment. The metadata file, such as metadata file 1039 in the bundle 1027 can also contain the sticker identifiers for each sticker, such as sticker image 1033 within the bundle 1027 as well as one or more optional authorization tokens.

Figure 17:
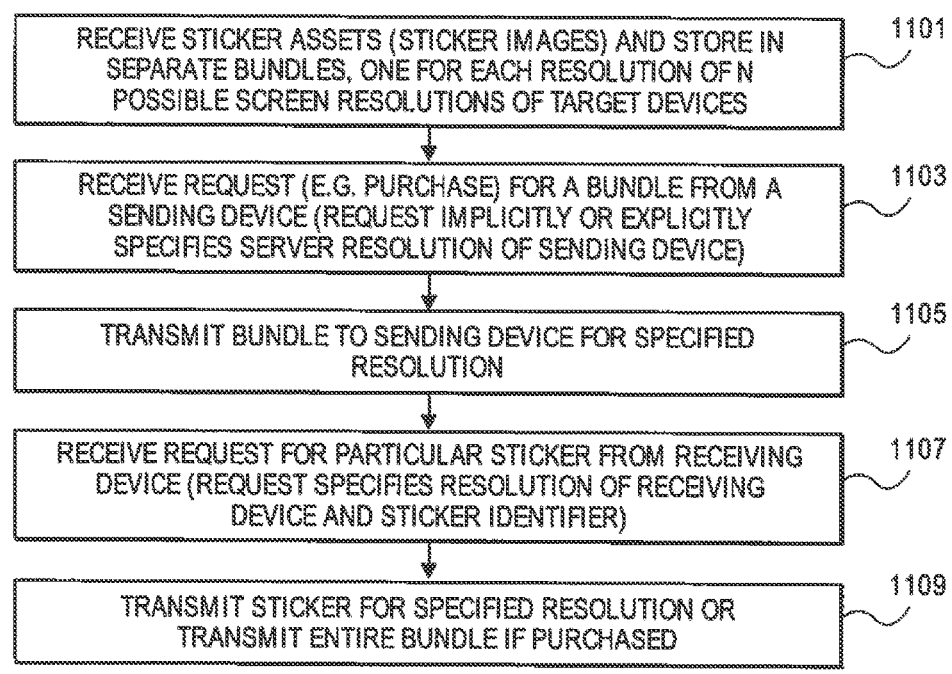
FIG. 17 is a flowchart which illustrates a method which can be performed by a set of one or more servers, such as the servers 1003 shown in FIG. 15.

FIG. 17 shows the method which can be performed by one or more server systems, such as the server systems which can implement the store 1003. In operation 1101 the one or more servers can receive a set of sticker assets, such as sticker images and store those sticker images in separate, distinct bundles, one for each resolution of possible screen resolutions of target devices. The receipt of these sticker assets typically occurs during the upload 1002 of stickers from one or more sticker developers such as one or more graphic artists. In one embodiment, the one or more server systems in the set of servers 1003 can separate out the sticker assets or sticker images into the different bundles based upon identifiers which specify the different screen resolutions of the target devices. The set of one or more servers 1003 can then store the sticker images in the various bundles to create one or more sticker databases, such as the sticker databases

1005 shown in FIG. 15 and shown in FIG. 16. In operation 1103, the one or more servers 1003 can receive a request, such as request 1008 from a sending device 1007 to purchase or otherwise obtain a bundle of stickers. In one embodiment, the request can either implicitly or explicitly specify a screen resolution of the device which is requesting the bundle, which can be sending device 1007. In one embodiment, an explicit specification of the screen resolution can specify the number of pixels per inch or other unit for an explicit specification of the screen resolution. In another embodiment, a device, such as sending device 1007 can implicitly specify screen resolution by specifying a model and manufacturer identifier for the device or by specifying a trait identifier as is used in the case of apps that are uploaded for distribution to the Apple app store. In operation 1105, the set of one or more servers 1003 can transmit the requested bundle of the stickers to the sending device, such as sending device 1007 for the specified resolution. In the example shown in FIG. 15, this is shown as a download operation 1009 which transmits the bundle to the sending device 1007.

At this point in the method shown in FIG. 17, the sending device can then send a message and a sticker (in the bundle) to a receiving device. The sending device can transmit an identifier for a particular sticker with the message to one or more receiving devices through one or more messaging servers, such as the messaging servers 1011 shown in FIG. 15. An authorization token can also be sent by the sending device to the receiving device. These one or more messaging servers can then forward the message in operation 1017 shown in FIG. 15 to one or more receiving devices, such as receiving device 1013. In turn, these one or more receiving devices can then request, in operation 1107 a particular sticker. This request can, in one embodiment specify a resolution of the receiving device and can specify other information such as the sticker identifier and an optional authorization token which was received from the sending device as described herein. Referring back to FIG. 15, the receiving device 1013 makes a request 1019 for a particular sticker identified by the sending device, and the receiving device 1013 can also specify either implicitly or explicitly the screen resolution of the receiving device and can also provide an authorization token to allow the receiving device 1013 to receive the particular sticker for the specific resolution of the receiving device without having to purchase the entire bundle of stickers. Referring back to operation 17, the one or more servers, such as one or more servers 1003 or the distribution servers 1021 can provide the sticker for the specified resolution in operation 1109 to the receiving device 1013. Alternatively, the receiving device can request the entire bundle of stickers either by purchasing or otherwise obtaining the entire bundle in operation 1109.

Figure 18A:
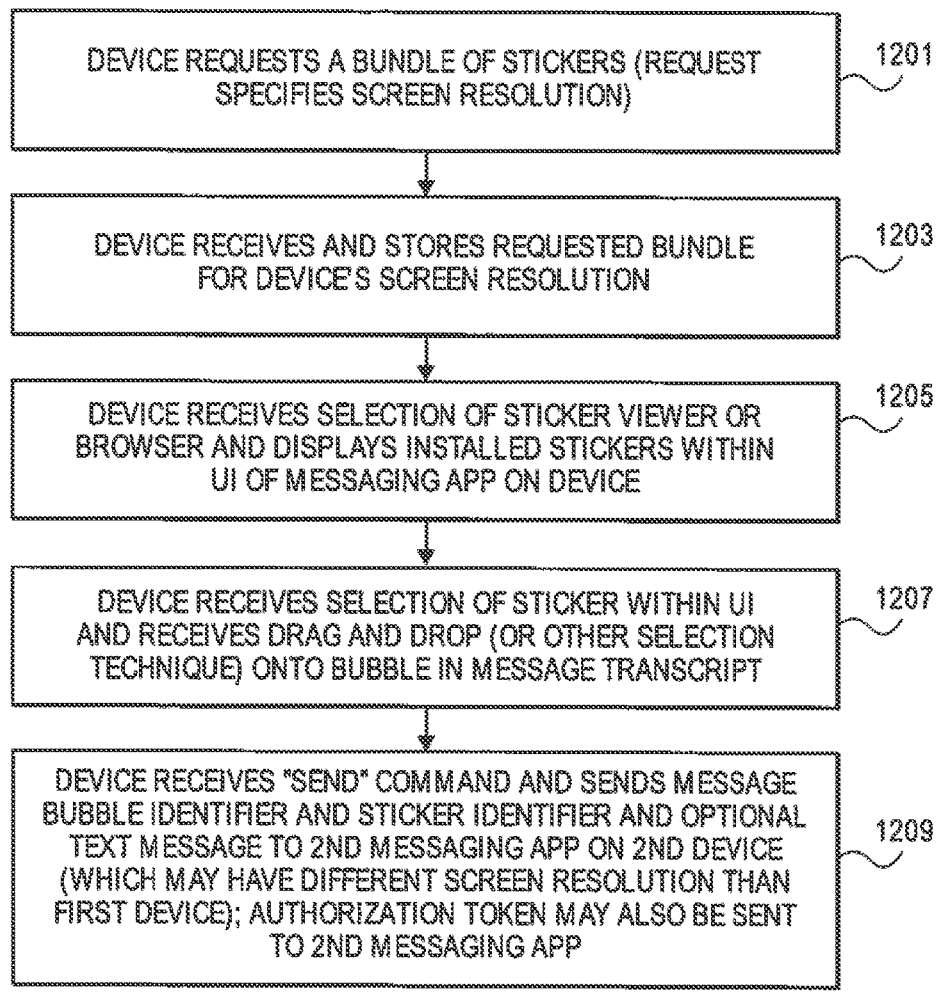
FIG. 18A is a flowchart which illustrates a method which can be performed by a sending device, such as the sending device 1007 shown in FIG. 15.

The method shown in FIG. 18A can be performed by a sending device, such as the sending device 1007 which obtains a bundle of stickers and which uses those stickers to send messages with one or more of those stickers. In operation 1201, a device, such as sending device 1007 can request a bundle of stickers, and that request can specify (either implicitly or explicitly) the screen resolution of the device. The request 1008 shown in FIG. 15 is an example of such a request which can specify the screen resolution of the sending device when the request for the bundle is made. In operation 1203, the device can receive and store the requested bundle for that device's screen resolution, and this can occur in the download 1009 shown in FIG. 15. Then in operation 1205, the device can receive a selection from the user of a sticker viewer or browser, such as the sticker drawer or tray 1253 shown in FIG. 19A which can display one or more installed stickers within a user interface of a messaging app on the device. Then in operation 1207 a sending device can receive a selection of a particular sticker within the user interface displaying the installed stickers (such as the drawer 1253), and the device can receive a drag and drop operation or other selection operation which indicates to the device the selection by the user of a particular bubble to which the selected sticker is to be attached in the message transcript. For example, the user may select the sticker 1262 shown in the sticker drawer 1253 and may drag that sticker onto the message bubble 1261 within the message transcript 1257 to attach that sticker 1262 to the message bubble 1261 which can then be sent after attaching the sticker to the message bubble. Then in operation 1209, the device can receive a send command from the user which causes the device to send the message bubble identifier and the sticker identifier an optional text message to another messaging app on another device, such as the second device which may have a different screen resolution than the first device. In addition, the messaging app on the sending device can also include with the message an authorization token which can be used by the second messaging app to retrieve the sticker without downloading the entire bundle which contained the sticker on the sending device.

Figure 18B:
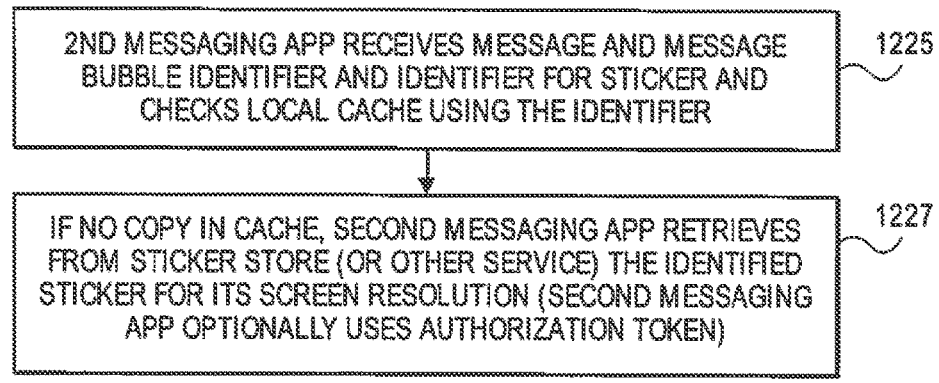
FIG. 18B is a flowchart which shows a method which can be performed by a receiving device, such as receiving device 1013 shown in FIG. 15.
Figure 19A:
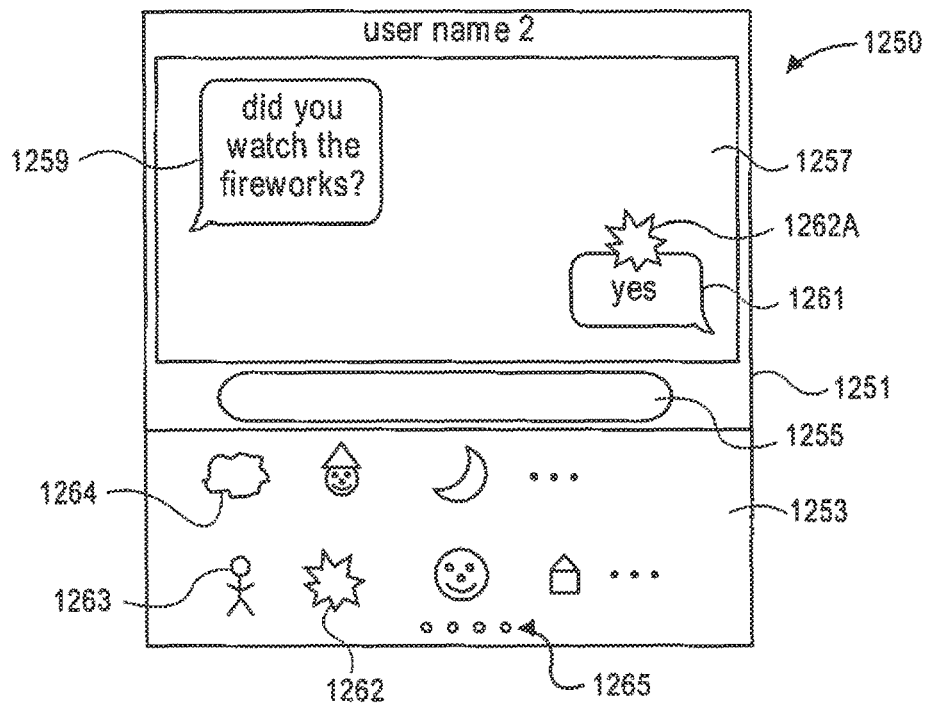
FIG. 19A shows an example of the user interface of a sending device, such as the sending device 1007.
Figure 19B:
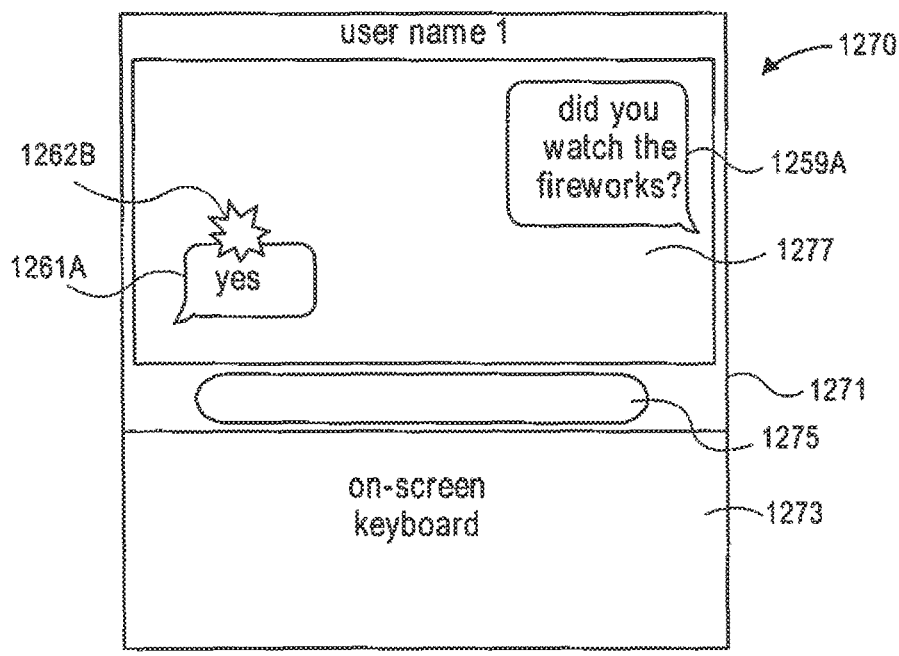
FIG. 19B shows an example of the user interface of a receiving device, such as the receiving device 1013 shown in FIG. 15.

FIG. 18B shows a method which can be performed on the receiving device, such as receiving device 1013 which can use the user interface shown in FIG. 19B on the receiving device. In operation 1225, the second messaging app on the receiving device can receive the message which can include the message bubble identifier and an identifier for a particular sticker. In addition, the second messaging app can include an authorization token which can be used by the second messaging app to retrieve the sticker from a store or other service, such as the one or more servers 1003 or the distribution servers 1021 shown in FIG. 15. A receiving device can in operation 1225 also check its local cache using the sticker identifier received from the other messaging app. If the second messaging app already has a local copy in its local cache of the sticker, then it can use that local copy to present the sticker in association with the message. An example of the presentation of the sticker in association with the message is shown in FIG. 19B in which the message bubble 1261A includes an associated sticker 1262B that was applied to the message bubble by the user of the sending device. If no local copy is present on the second device which includes the second messaging app then, in operation 1227, the second messaging app can retrieve the sticker from the sticker store or one or more other services, such as the distribution servers 1021 by using the sticker identifier to retrieve the sticker for its screen resolution. For example, a receiving device 1013 shown in FIG. 15 can request a sticker in communication 1019 by specifying the sticker identifier and optionally an authorization token. This request can be made to either the one or more servers 1003 or the distribution servers 1021 which can return the identified sticker. In one embodiment, the receiving device can be required to purchase the bundle in order to display the sticker, while in an alternative embodiment, the authorization token can be used to cause the sticker store or distribution servers to provide the appropriate sticker for the screen resolution of the receiving device to the receiving device without having to purchase or download the entire bundle of stickers which included the particular sticker.

FIG. 19A shows an example of a user interface on a sending device, such as sending device 1007. In particular, sending device 1250 can include a touch screen 1251 and a sticker drawer 1253 and a text entry region 1255 that are displayed on the touch screen 1251. In addition, the sending device 1250 can include a message transcript 1257 which can include one or more message bubbles, such as message bubble 1259 and message bubble 1261. In the example shown in FIG. 12A, a user has selected one of the stickers, in this case sticker 1262 and has caused that sticker to be associated with the message bubble 1261 which can then be sent by the sending device to a receiving device through one or more servers, such as the one or more messaging servers 1011 shown in FIG. 15. A set of stickers, such as stickers 1264, 1263, and 1262 can be displayed within the sticker drawer 1253 which can have a plurality of pages through which a user can browse or scroll using techniques known in art. The one or more pages are indicated by page indicator 1265 which shows that there are at least four pages of stickers which can be selected by the user and applied to one or more messages in the message transcript 1257. In the example shown in FIG. 19A, it can be seen that the user of the device 1250 has selected the sticker 1262 and has associated it with the bubble 1261. In one embodiment, this can be performed by selecting the sticker 1262 within the drawer 1253 and dragging or otherwise indicating the sticker is to be associated with the message bubble 1261 which is responding to the messaging bubble 1259. When the user of the device 1250 selects the second command, this causes the message shown in message bubble 1261 with the associated sticker 1262A to be sent to the receiving device, which in one embodiment is shown in FIG. 19B as the receiving device 1270 which presents the message bubble 1261A with the associated sticker 1262B which was sent by the sending device 1250. The receiving device shown in FIG. 19B also includes a message transcript 1277 which displays two message bubbles, 1259A and 1261A within the message transcript 1277. The message transcript 1277 is also displayed in conjunction with text entry region 1275 and an on-screen keyboard 1273 on the touch screen 1271 as shown in FIG. 19B.

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program (e.g., game center application) to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 20:
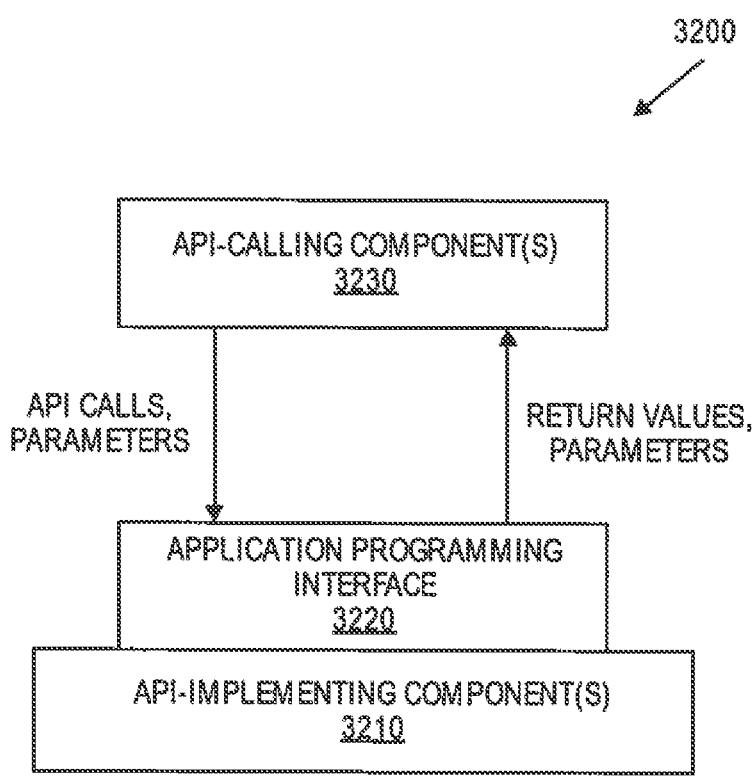
FIG. 20 is a block diagram illustrating an exemplary API architecture, which may be used in one or more of the embodiments described herein.

FIG. 20 is a block diagram illustrating an exemplary API architecture, which may be used in one embodiment of the present invention. As shown in FIG. 20, the API architecture 3200 includes the API-implementing component 3210 (e.g., an operating system, a library, a device driver, an API, an application program, software or other module) that implements the API 3220. The API 3220 specifies one or more functions, methods, classes, objects, protocols, data structures, formats and/or other features of the API-implementing component that may be used by the API-calling component 3230. The API 3220 can specify at least one calling convention that specifies how a function in the API-implementing component receives parameters from the API-calling component and how the function returns a result to the API-calling component. The API-calling component 3230 (e.g., an operating system, a library, a device driver, an API, an application program, software or other module) makes API calls through the API 3220 to access and use the features of the API-implementing component 3210 that are specified by the API 3220. The API-implementing component 3210 may return a value through the API 3220 to the API-calling component 3230 in response to an API call.

It will be appreciated that the API-implementing component 3210 may include additional functions, methods, classes, data structures, and/or other features that are not specified through the API 3220 and are not available to the API-calling component 3230. It should be understood that the API-calling component 3230 may be on the same system as the API-implementing component 3210 or may be located remotely and accesses the API-implementing component 3210 using the API 3220 over a network. While FIG. 20 illustrates a single API-calling component 3230 interacting with the API 3220, it should be understood that other API-calling components, which may be written in different languages (or the same language) than the API-calling component 3230, may use the API 3220.

The API-implementing component 3210, the API 3220, and the API-calling component 3230 may be stored in a machine-readable medium (e.g., computer-readable medium), which includes any mechanism for storing information in a form readable by a machine (e.g., a computer or other data processing system). For example, a machine-readable medium includes magnetic disks, optical disks, random access memory; read only memory, flash memory devices, etc.

Figure 21:
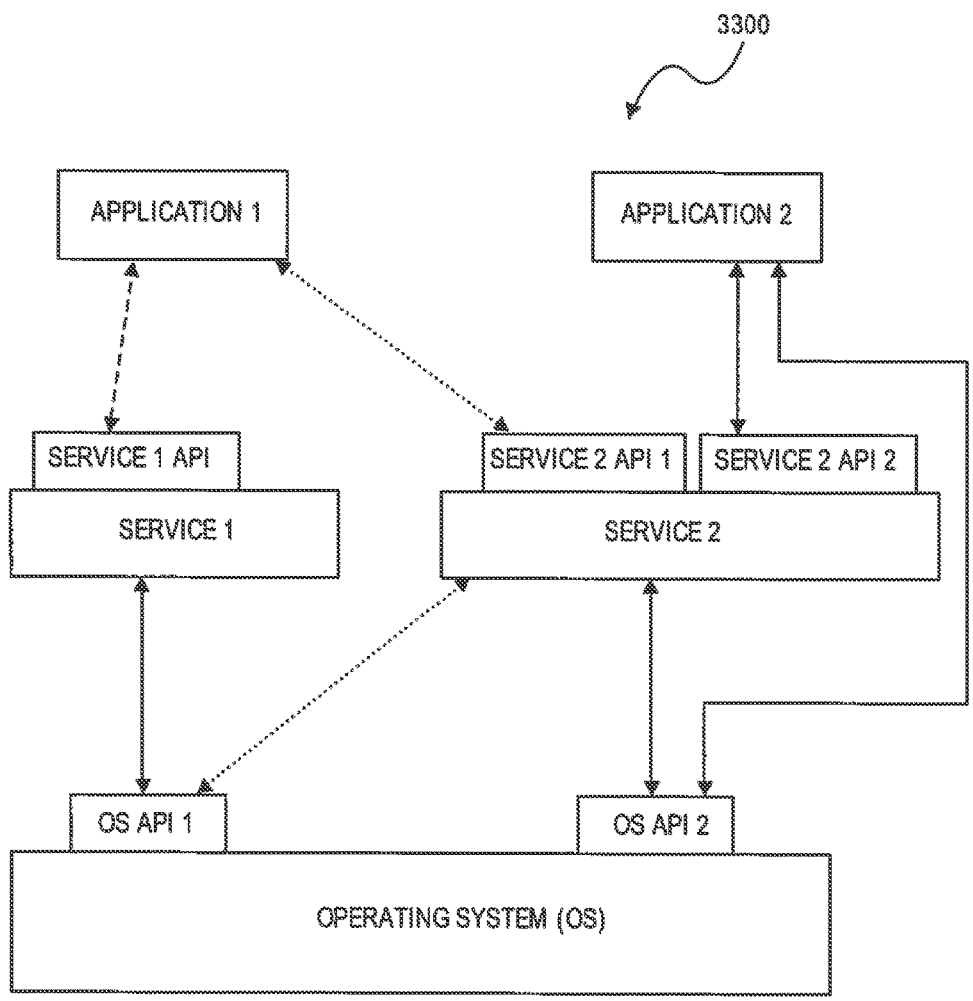
FIG. 21 shows a block diagram illustrating a software stack which can include one or more applications and services in operating systems.

In FIG. 21 ("Software Stack"), in one embodiment of the present invention, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include desktop computers, laptop computers, tablet computers, smart phones, cellular telephones, personal digital assistants (PDAs), embedded electronic devices, or consumer electronic devices.

Figure 22:
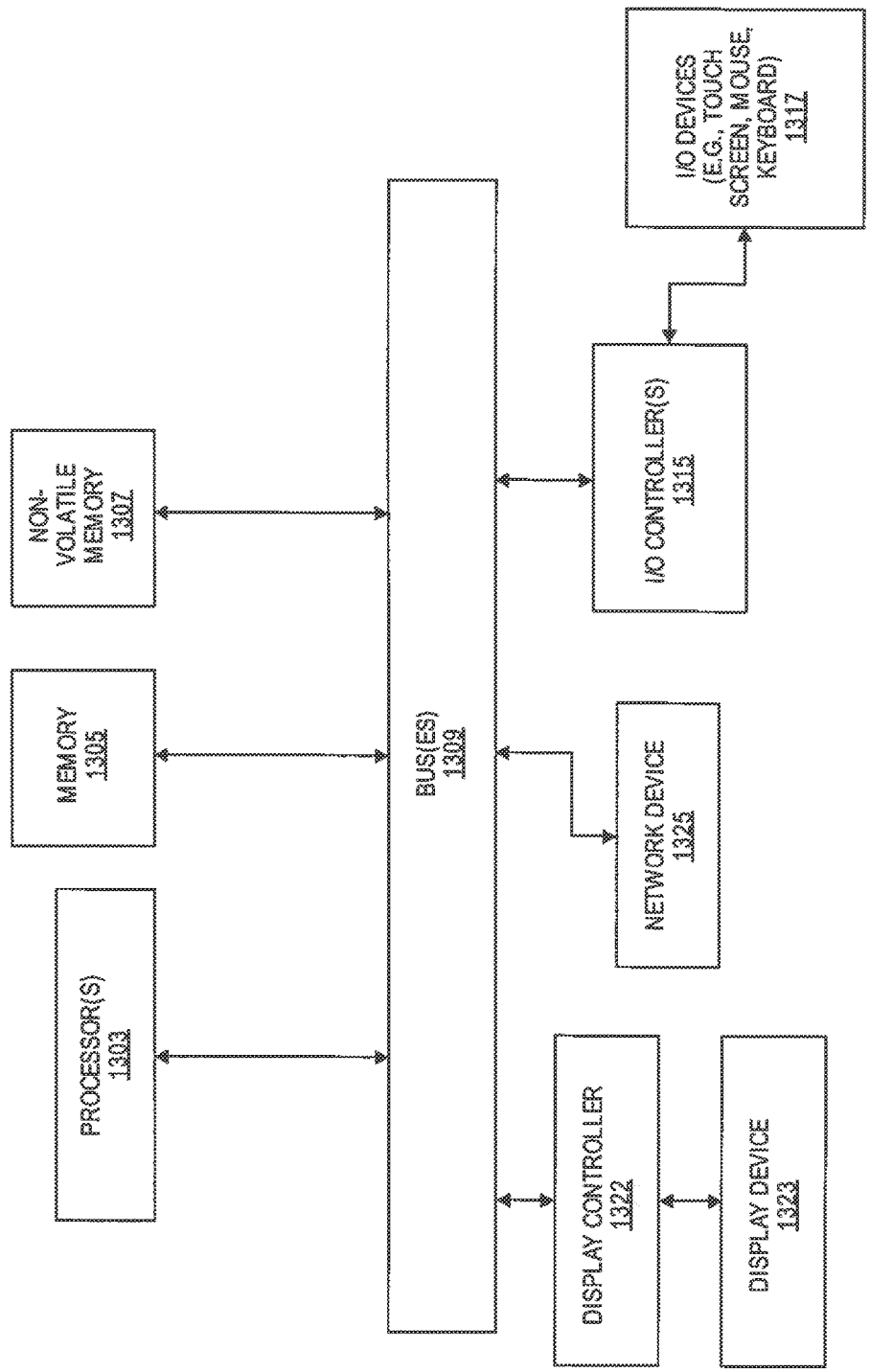
FIG. 22 shows an example of a data processing system which can be used in one or more embodiments described herein.

FIG. 22 is a block diagram of data processing system hardware according to an embodiment. Note that while FIG. 22 illustrates the various components of a data processing system that may be incorporated into a mobile or handheld device, it is not intended to represent any particular architecture or manner of interconnecting the components as such details are not germane to the present invention. It will also be appreciated that other types of data processing systems that have fewer components than shown or more components than shown in FIG. 22 can also be used with the present invention.

As shown in FIG. 22, the data processing system includes one or more buses 1309 that serve to interconnect the various components of the system. One or more processors 1303 are coupled to the one or more buses 1309 as is known in the art. Memory 1305 may be DRAM or non-volatile RAM or may be flash memory or other types of memory or a combination of such memory devices. This memory is coupled to the one or more buses 1309 using techniques known in the art. The data processing system can also include non-volatile memory 1307, which may be a hard disk drive or a flash memory or a magnetic optical drive or magnetic memory or an optical drive or other types of memory systems that maintain data even after power is removed from the system. The non-volatile memory 1307 and the memory 1305 are both coupled to the one or more buses 1309 using known interfaces and connection techniques. A display controller 1322 is coupled to the one or more buses 1309 in order to receive display data to be displayed on a display device 1323. The display device 1323 can include an integrated touch input to provide a touch screen. The data processing system can also include one or more input/output (I/O) controllers 1315 which provide interfaces for one or more I/O devices, such as one or more mice, touch screens, touch pads, joysticks, and other input devices including those known in the art and output devices (e.g. speakers). The input/output devices 1317 are coupled through one or more I/O controllers 1315 as is known in the art.

While FIG. 22 shows that the non-volatile memory 1307 and the memory 1305 are coupled to the one or more buses directly rather than through a network interface, it will be appreciated that the present invention can utilize non-volatile memory that is remote from the system, such as a network storage device which is coupled to the data processing system through a network interface such as a modem or Ethernet interface. The buses 1309 can be connected to each other through various bridges, controllers and/or adapters as is well known in the art. In one embodiment the I/O controller 1315 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) 1325 can be coupled to the bus(es) 1309. The network device(s) 1325 can be wired network devices (e.g., Ethernet) or wireless network devices (e.g., WI-FI, Bluetooth).

It will be apparent from this description that aspects of the present invention may be embodied, at least in part, in software. That is, the techniques may be carried out in a data processing system in response to its processor executing a sequence of instructions contained in a storage medium, such as a non-transitory machine-readable storage medium (e.g. DRAM or flash memory). In various embodiments, hardwired circuitry may be used in combination with software instructions to implement the present invention. Thus the techniques are not limited to any specific combination of hardware circuitry and software, or to any particular source for the instructions executed by the data processing system. Moreover, it will be understood that where mobile or handheld devices are described, the description encompasses mobile devices (e.g., laptop devices, tablet devices), handheld devices (e.g., smartphones), as well as embedded systems suitable for use in wearable electronic devices.

The present disclosure recognizes that the use of personal information data (such as health data collected by one or more watches), in the present technology, can be used to the benefit of users. For example, the personal information data can be used to deliver health related information or targeted content that is of greater interest to the user. Accordingly, use of such personal information data can enable calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of health information or advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a data processing system cause the data processing system to perform a method comprising:

receiving a plurality of stickers, each sticker comprising an image for use within a messaging application, each sticker in the plurality of stickers having a plurality of versions for use with different screen resolutions;

grouping the plurality of stickers into a plurality of bundles, each bundle of the plurality of bundles having stickers in a respective version for one of the different screen resolutions;

storing the plurality of bundles in a memory;

receiving, subsequent to the storing, a first request from a first device for a set of stickers, the first request specifying a screen resolution of the first device;

retrieving, in response to the first request and from the memory, a first bundle of the plurality of bundles that is for use with the screen resolution of the first device; and sending the first bundle of the plurality of bundles to the first device.

2. The medium as in claim 1 wherein one of the versions of the plurality of versions is a high resolution version for use on a high resolution screen and another version of the plurality of versions is a low resolution version for use on a low resolution screen and wherein each of the bundles has stickers of only one of the different screen resolutions.

3. The medium as in claim 1 wherein the method is performed by one or more servers in a service that provides one or more catalogs of apps, messaging extension apps and stickers and wherein the plurality of stickers are received from a developer of stickers or a graphic artist.

4. The medium as in claim 3 wherein the first request is from a first messaging app that is configured to communicate text messages with other messaging apps through one or more messaging servers.

5. The medium as in claim 4 wherein the first request specifies a screen resolution either implicitly or explicitly.

6. The medium as in claim 5 wherein the first request implicitly specifies the screen resolution by specifying a set of model and manufacturer identifiers.

7. The medium as in claim 6 wherein each bundle includes a metadata file that contains sticker identifiers, one for each sticker in the bundle.

8. The medium as in claim 1, wherein the method further comprises:
receiving a second request from a second device for the set of stickers, the second request specifying a screen resolution of the second device which is different than the screen resolution of the first device; and
sending, in response to the second request, a second bundle of the plurality of bundles that is for use with the screen resolution of the second device.

9. The medium as in claim 1, wherein the method further comprises:
receiving a second request from a second device for one of the stickers in the set of stickers, the second request specifying a sticker identifier and a screen resolution of the second device which is different than the screen resolution of the first device, the second request being in response to receiving a message from a first messaging app on the first device, the message including the sticker identifier; and
sending, in response to the second request, at least one of: the sticker identified by the sticker identifier that is for use with the screen resolution of the first device, or the bundle containing the sticker identified by the sticker identifier that is for use with the screen resolution of the first device.

10. The medium as in claim 1 wherein each bundle includes a metadata file that contains sticker identifiers, one for each bundle and also contains an attribution or identifier of a developer of the stickers or a graphic artist and also contains at least one authorization token which is sent, with an identifier for one of the stickers in the bundle, from the first device to a second device that includes a messaging app which uses the authorization token and the identifier to retrieve the sticker that is identified by the identifier and that is for use with the screen resolution of the second device.

11. A machine implemented method comprising:
receiving a plurality of stickers, each sticker comprising an image, each sticker in the plurality of stickers having a plurality of versions for use with different screen resolutions;
grouping the plurality of stickers into a plurality of bundles, each bundle of the plurality of bundles having stickers in a respective version for one of the different screen resolutions;
storing the plurality of bundles in a memory;
receiving, subsequent to the storing, a first request from a first device for a set of stickers, the first request specifying a screen resolution of the first device;
retrieving, in response to the first request and from the memory, a first bundle of the plurality of bundles that is for use with the screen resolution of the first device; and
sending the first bundle of the plurality of bundles to the first device.

12. The method as in claim 11 wherein one of the versions of the plurality of versions is a high resolution version for use on a high resolution screen and another version of the plurality of versions is a low resolution version for use on a low resolution screen and wherein each of the bundles has stickers of only one of the different screen resolutions.

13. The method as in claim 11 wherein the method is performed by one or more servers in a service that provides one or more catalogs of apps, messaging extension apps and stickers and wherein the plurality of stickers are received from a developer of stickers or a graphic artist.

14. The method as in claim 13 wherein the first request is from a first messaging app that is configured to communicate text messages with other messaging apps through one or more messaging servers.

15. The method as in claim 14 wherein the first request specifies a screen resolution either implicitly or explicitly.

16. The method as in claim 15 wherein the first request implicitly specifies the screen resolution by specifying a set of model and manufacturer identifiers.

17. The method as in claim 16 wherein each bundle includes a metadata file that contains sticker identifiers, one for each sticker in the bundle.

18. The method as in claim 11, wherein the method further comprises:
receiving a second request from a second device for the set of stickers, the second request specifying a screen resolution of the second device which is different than the screen resolution of the first device; and
sending, in response to the second request, a second bundle of the plurality of bundles that is for use with the screen resolution of the second device.

19. The method as in claim 11, wherein the method further comprises:
receiving a second request from a second device for one of the stickers in the set of stickers, the second request specifying a sticker identifier and being in response to receiving a message from a first messaging app on the first device, the message including the sticker identifier; and
sending, in response to the second request, at least one of: the sticker identified by the sticker identifier or the bundle containing the sticker identified by the sticker identifier.

20. The method as in claim 11 wherein each bundle includes a metadata file that contains sticker identifiers, one for each bundle and also contains an attribution or identifier of a developer of the stickers or a graphic artist and also contains at least one authorization token which is sent, with an identifier for one of the stickers in the bundle, from the first device to a second device that includes a messaging app which uses the authorization token and the identifier to retrieve the sticker that is identified by the identifier and that is for use with the screen resolution of the second device.

21. A device, comprising:
at least one processor; and
a first memory including instructions that, when executed by the at least one processor, cause the at least one processor to:
receive a plurality of stickers, each sticker comprising an image, each sticker in the plurality of stickers having a plurality of versions for use with different screen resolutions;
group the plurality of stickers into a plurality of bundles, each bundle of the plurality of bundles having stickers in a respective version for one of the different screen resolutions;
store the plurality of bundles in a second memory;
receive, subsequent to the storing, a first request from a first device for a set of stickers, the first request specifying a screen resolution of the first device;

retrieve, in response to the first request and from the second memory, a first bundle of the plurality of bundles that is for use with the screen resolution of the first device; and send the first bundle of the plurality of bundles to the first device.

* * * * *